US008681148B2

(12) United States Patent
Ishiguchi

(10) Patent No.: US 8,681,148 B2
(45) Date of Patent: Mar. 25, 2014

(54) METHOD FOR CORRECTING STEREOSCOPIC IMAGE, STEREOSCOPIC DISPLAY DEVICE, AND STEREOSCOPIC IMAGE GENERATING DEVICE

(75) Inventor: Kazuhiro Ishiguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 549 days.

(21) Appl. No.: 12/979,822

(22) Filed: Dec. 28, 2010

(65) Prior Publication Data

US 2011/0169821 A1 Jul. 14, 2011

(30) Foreign Application Priority Data

Jan. 12, 2010 (JP) ................................. 2010-003634
Nov. 16, 2010 (JP) ................................. 2010-255678

(51) Int. Cl.
*G06T 15/00* (2011.01)

(52) U.S. Cl.
USPC .......................................... 345/419; 382/154

(58) Field of Classification Search
None
See application file for complete search history.

(56) References Cited

U.S. PATENT DOCUMENTS 6,501,451 B1 12/2002 Sakashita
6,573,928 B1 6/2003 Jones et al.
6,747,621 B2 6/2004 Miyake
7,210,836 B2 5/2007 Sasagawa et al.
2002/0159650 A1* 10/2002 Hiroshige et al. ............ 382/261
2003/0117489 A1* 6/2003 Jones et al. ..................... 348/51
2008/0231624 A1* 9/2008 Poon ............................ 345/212
2009/0167959 A1* 7/2009 Nakamura et al. ............ 348/699
2009/0279808 A1* 11/2009 Shiraishi ....................... 382/275

FOREIGN PATENT DOCUMENTS

JP 8-331600 12/1996
JP 11-126050 5/1999
JP 2000-4455 1/2000
JP 2001-66547 3/2001
JP 2001-298754 10/2001
JP 2002-62850 2/2002
JP 2004-253879 9/2004
JP 2004336244 A * 11/2004 ............ H04N 5/335
JP 2006-157775 6/2006
JP 2008-9039 1/2008
WO WO 2004/027492 A1 4/2004

OTHER PUBLICATIONS

Sasaki, Yasuhiko, and Giovanni De Micheli. "Crosstalk delay analysis using relative window method." ASIC/SOC Conference, 1999. Proceedings. Twelfth Annual IEEE International. IEEE, 1999.*

* cited by examiner

*Primary Examiner* — Daniel Hajnik
*Assistant Examiner* — Sultana M Zalalee
(74) *Attorney, Agent, or Firm* — Oblon, Spivak, McClelland, Maier & Neustadt, L.L.P.

(57) ABSTRACT

An object of the invention to provide a method for maintaining display quality as much as possible and reducing a crosstalk amount. A method for correcting stereoscopic images according to the present invention has (a) at least one of a step of detecting a range of crosstalk and a crosstalk amount occurring on a left image or a right image as black-side correction data, and a step of detecting the range of crosstalk and the crosstalk amount as white-side correction data, based on crosstalk characteristic data, (b) at least one of a step of making the black-side correction data into lower-limit data, and a step of making the white-side correction data into upper-limit data; and (c) a step of gamma-converting the left image or the right image based on at least one of the lower-limit data and the upper-limit data.

10 Claims, 21 Drawing Sheets

F I G . 5
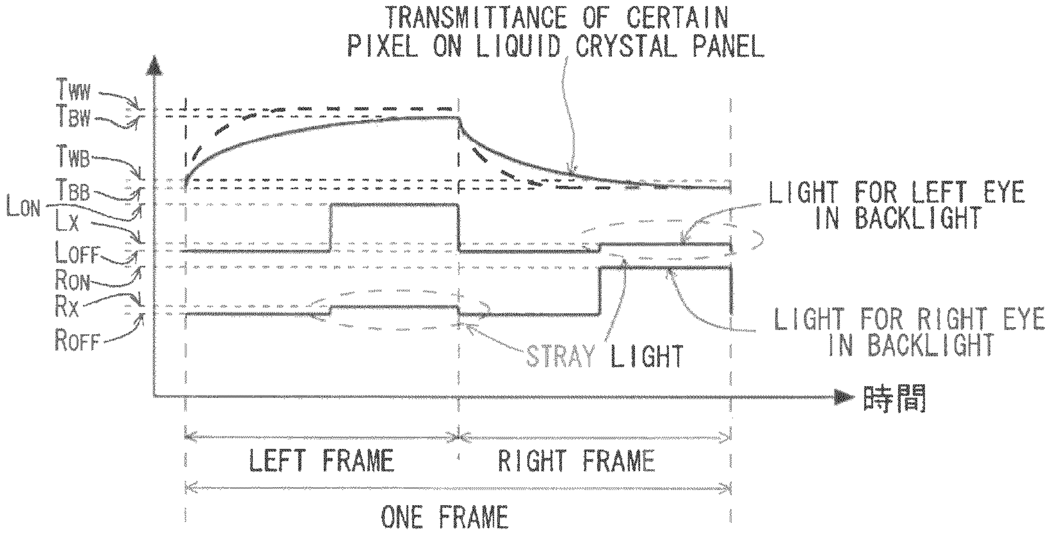
F I G . 6
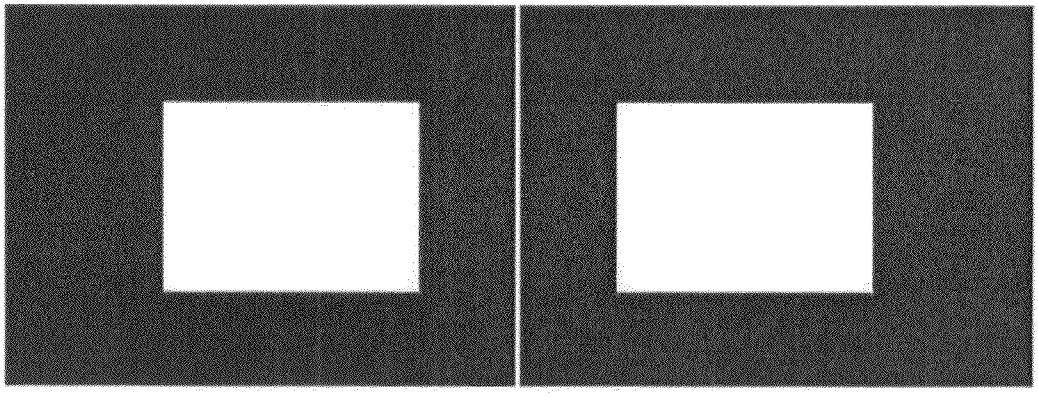

F I G . 7
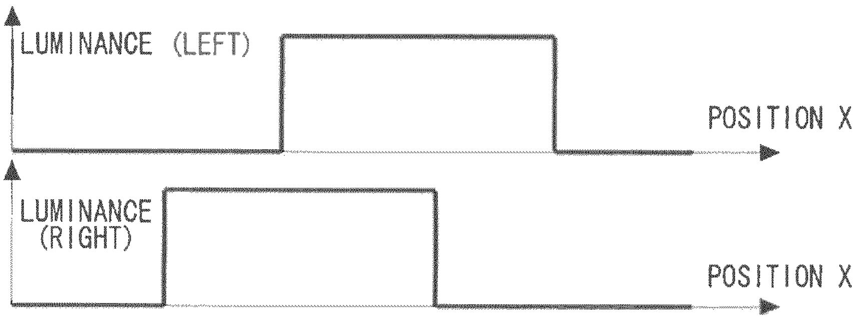
F I G . 8
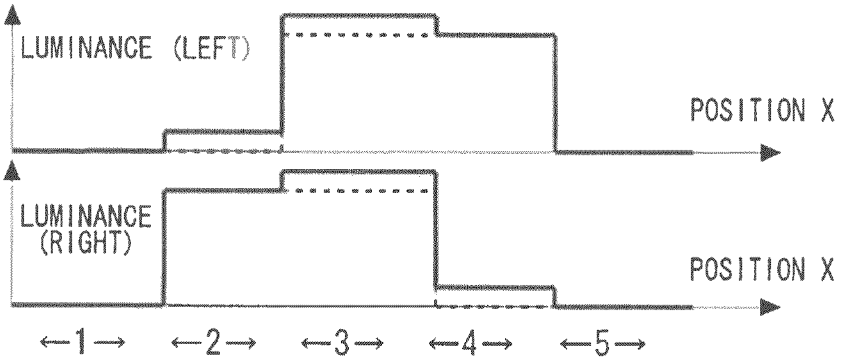
F I G . 9
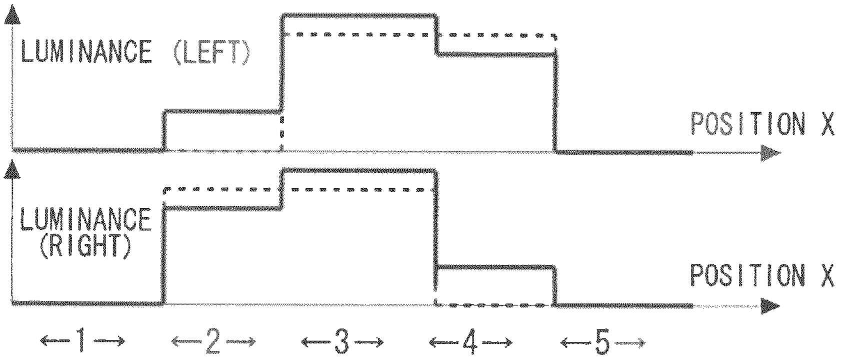

F I G. 13
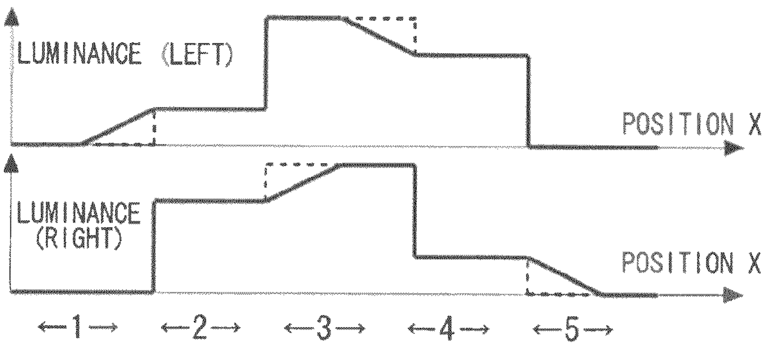
F I G. 14
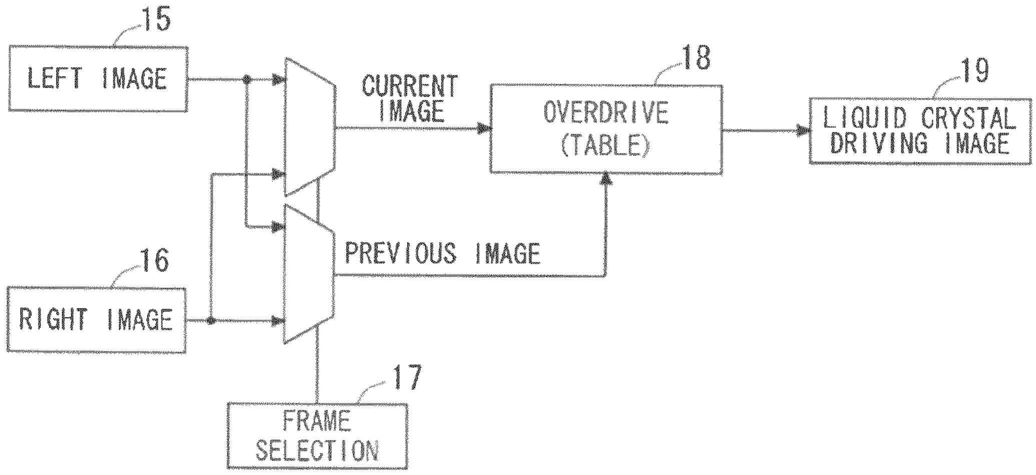

| | | CURRENT GRADATION | | | | | | | | |
|---|---|---|---|---|---|---|---|---|---|---|
| | | 0 | 32 | 64 | 96 | 128 | 160 | 192 | 224 | 255 |
| PREVIOUS GRADATION | 0 | 0 | 32 | 64 | 96 | 128 | 160 | 192 | 224 | 255 |
| | 32 | 0 | 32 | 64 | 96 | 128 | 160 | 192 | 224 | 255 |
| | 64 | 0 | 32 | 64 | 96 | 128 | 160 | 192 | 224 | 255 |
| | 96 | 0 | 32 | 64 | 96 | 128 | 160 | 192 | 224 | 255 |
| | 128 | 0 | 32 | 64 | 96 | 128 | 160 | 192 | 224 | 255 |
| | 160 | 0 | 32 | 64 | 96 | 128 | 160 | 192 | 224 | 255 |
| | 192 | 0 | 32 | 64 | 96 | 128 | 160 | 192 | 224 | 255 |
| | 224 | 0 | 32 | 64 | 96 | 128 | 160 | 192 | 224 | 255 |
| | 255 | 0 | 32 | 64 | 96 | 128 | 160 | 192 | 224 | 255 |

FIG. 17
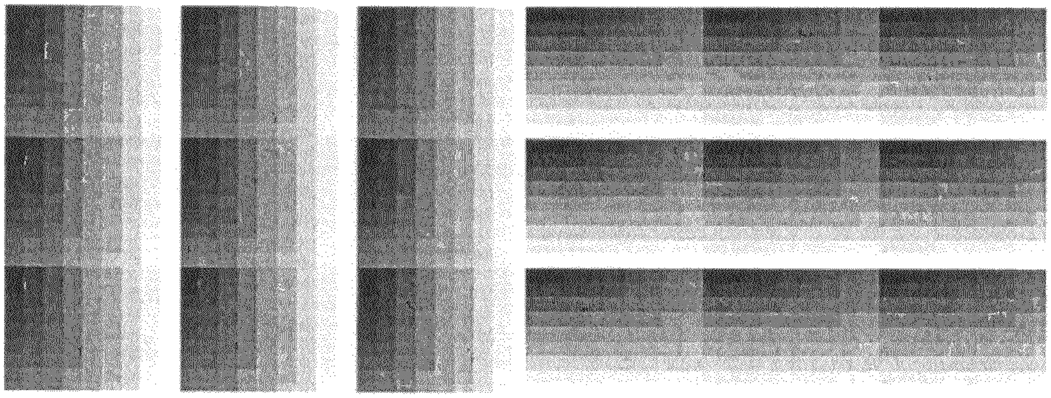
FIG. 18
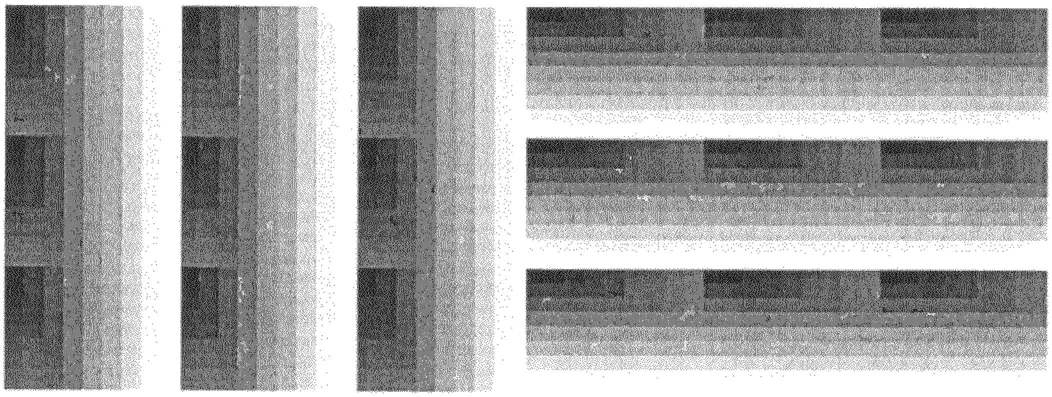
FIG. 19
| | | CURRENT GRADATION | | | | | | | | |
|---|---|---|---|---|---|---|---|---|---|---|
| | | 0 | 32 | 64 | 96 | 128 | 160 | 192 | 224 | 255 |
| PREVIOUS GRADATION | 0 | 0 | 32 | 64 | 96 | 128 | 160 | 192 | 224 | 244 |
| | 32 | 11 | 32 | 64 | 96 | 128 | 160 | 192 | 224 | 244 |
| | 64 | 23 | 32 | 64 | 96 | 128 | 160 | 192 | 224 | 244 |
| | 96 | 34 | 34 | 64 | 96 | 128 | 160 | 192 | 224 | 244 |
| | 128 | 45 | 45 | 64 | 96 | 128 | 160 | 192 | 224 | 246 |
| | 160 | 56 | 56 | 64 | 96 | 128 | 160 | 192 | 224 | 247 |
| | 192 | 68 | 68 | 67 | 96 | 128 | 160 | 192 | 224 | 249 |
| | 224 | 79 | 79 | 79 | 96 | 128 | 160 | 192 | 224 | 252 |
| | 255 | 86 | 86 | 86 | 96 | 128 | 160 | 192 | 224 | 255 |

F I G. 2 1

| | | CURRENT GRADATION | | | | | | | | |
|---|---|---|---|---|---|---|---|---|---|---|
| | | 0 | 32 | 64 | 96 | 128 | 160 | 192 | 224 | 255 |
| PREVIOUS GRADATION | 0 | 0 | 0 | 0 | 0 | 0 | 0 | 0 | 0 | −11 |
| | 32 | 11 | 0 | 0 | 0 | 0 | 0 | 0 | 0 | −11 |
| | 64 | 23 | 0 | 0 | 0 | 0 | 0 | 0 | 0 | −11 |
| | 96 | 34 | 2 | 0 | 0 | 0 | 0 | 0 | 0 | −11 |
| | 128 | 45 | 13 | 0 | 0 | 0 | 0 | 0 | 0 | −9 |
| | 160 | 56 | 24 | 0 | 0 | 0 | 0 | 0 | 0 | −8 |
| | 192 | 68 | 36 | 3 | 0 | 0 | 0 | 0 | 0 | −6 |
| | 224 | 79 | 47 | 15 | 0 | 0 | 0 | 0 | 0 | −3 |
| | 255 | 86 | 54 | 22 | 0 | 0 | 0 | 0 | 0 | 0 |

F I G. 2 2

| | | CURRENT GRADATION | | | | | | | | |
|---|---|---|---|---|---|---|---|---|---|---|
| | | 0 | 32 | 64 | 96 | 128 | 160 | 192 | 224 | 255 |
| PREVIOUS GRADATION | 0 | 0 | 0 | 0 | 0 | 0 | 0 | 0 | 0 | 0 |
| | 32 | 11 | 0 | 0 | 0 | 0 | 0 | 0 | 0 | 0 |
| | 64 | 23 | 0 | 0 | 0 | 0 | 0 | 0 | 0 | 0 |
| | 96 | 34 | 2 | 0 | 0 | 0 | 0 | 0 | 0 | 0 |
| | 128 | 45 | 15 | 0 | 0 | 0 | 0 | 0 | 0 | 0 |
| | 160 | 56 | 27 | 0 | 0 | 0 | 0 | 0 | 0 | 0 |
| | 192 | 68 | 41 | 4 | 0 | 0 | 0 | 0 | 0 | 0 |
| | 224 | 79 | 54 | 20 | 0 | 0 | 0 | 0 | 0 | 0 |
| | 255 | 86 | 62 | 29 | 0 | 0 | 0 | 0 | 0 | 0 |

FIG. 23
| PREVIOUS GRADATION \ CURRENT GRADATION | 0 | 32 | 64 | 96 | 128 | 160 | 192 | 224 | 255 |
|---|---|---|---|---|---|---|---|---|---|
| 0 | 0 | 0 | 0 | 0 | 0 | 0 | 0 | 0 | 11 |
| 32 | 0 | 0 | 0 | 0 | 0 | 0 | 0 | 0 | 11 |
| 64 | 0 | 0 | 0 | 0 | 0 | 0 | 0 | 0 | 11 |
| 96 | 0 | 0 | 0 | 0 | 0 | 0 | 0 | 0 | 11 |
| 128 | 0 | 0 | 0 | 0 | 0 | 0 | 0 | 0 | 9 |
| 160 | 0 | 0 | 0 | 0 | 0 | 0 | 0 | 0 | 8 |
| 192 | 0 | 0 | 0 | 0 | 0 | 0 | 0 | 0 | 6 |
| 224 | 0 | 0 | 0 | 0 | 0 | 0 | 0 | 0 | 3 |
| 255 | 0 | 0 | 0 | 0 | 0 | 0 | 0 | 0 | 0 |
FIG. 24
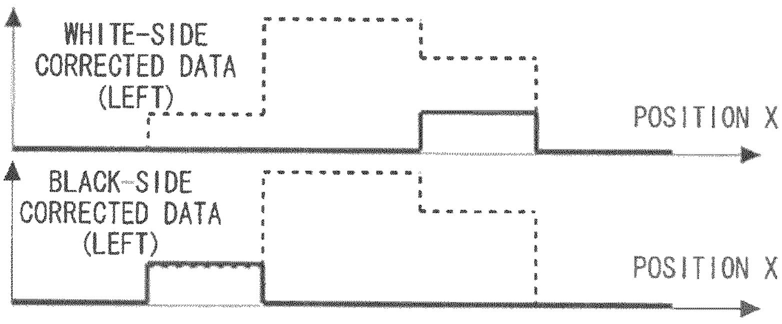
FIG. 25
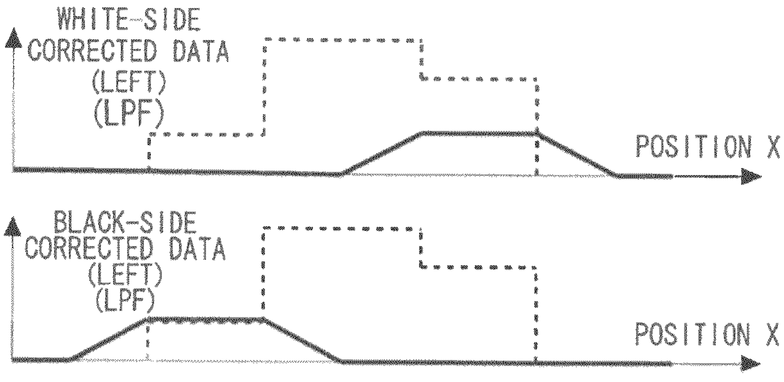

F I G . 2 6
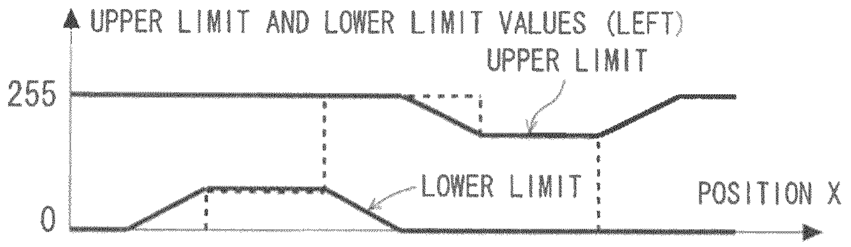
F I G . 2 7
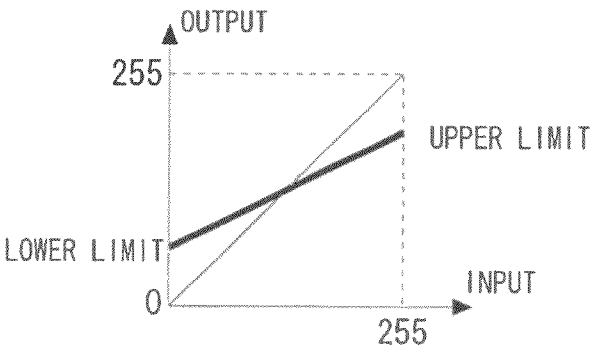
F I G . 2 8
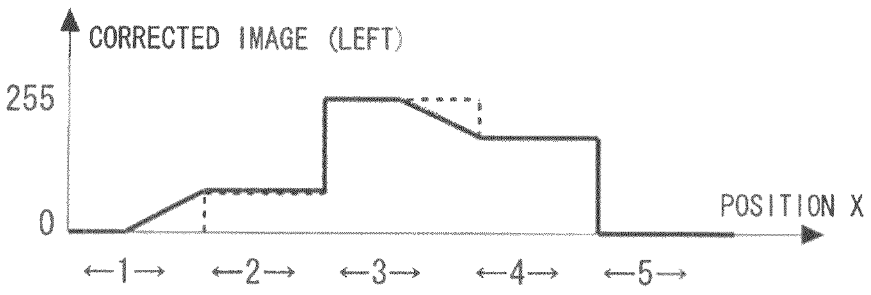

F I G. 3 1
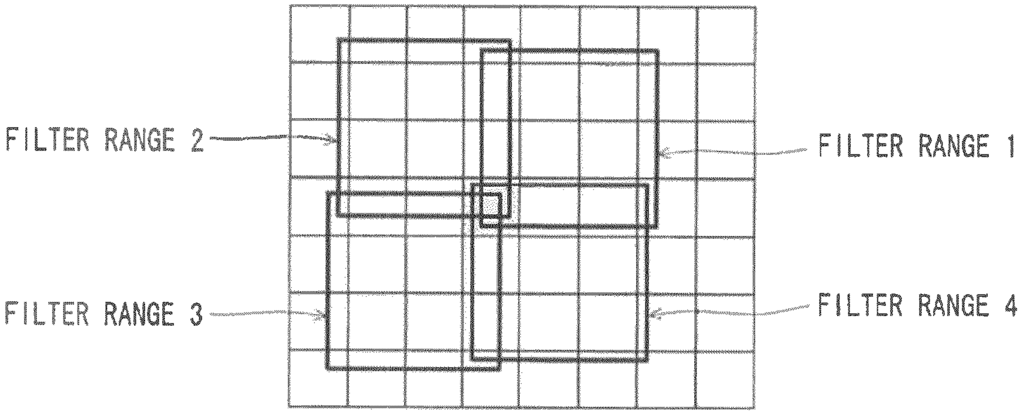
F I G. 3 2
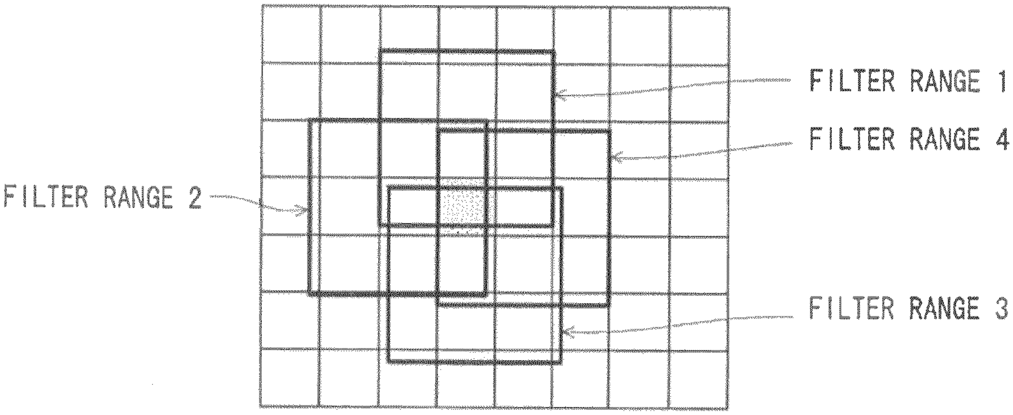

METHOD FOR CORRECTING STEREOSCOPIC IMAGE, STEREOSCOPIC DISPLAY DEVICE, AND STEREOSCOPIC IMAGE GENERATING DEVICE

BACKGROUND OF THE INVENTION

1. Field of the Invention

The present invention relates to a method for correcting stereoscopic images in which stereoscopic images are corrected, a stereoscopic display device and a stereoscopic image generating device using the method for correcting stereoscopic images.

2. Description of the Background Art

Conventionally, stereoscopic devices adopting various systems that enable stereoscopic viewing with naked eyes and that use a special pair of eyeglasses are put to practical use. A method for enabling stereoscopic viewing with naked eyes includes holography, a method for controlling light reaching viewer's right and let eyes using a parallax barrier or a lenticular lens provided to a surface of a liquid crystal panel, and a method for controlling light reaching viewer's right and left eyes in a time division system by combining backlight having directivity of outgoing light (hereinafter, directional backlight) and a liquid crystal panel of a field sequential system.

On the other hand, the method using a special pair of eyeglasses includes a method for providing polarization plates having a different polarizing direction between right and left eyeglasses and viewing images whose polarization is different and separating the right and left images, and a method for controlling light reaching viewer's right and left eyes in a time division system by combining shutter eyeglasses with a liquid crystal panel of field sequential system.

In many stereoscopic display devices adopting the above systems, a stereoscopic crosstalk (hereinafter, crosstalk) caused by various factors, which deteriorates visibility of stereoscopic images, is present. The crosstalk means that right and left parallax images are mixed (seen) with a right image and a left image. When the crosstalk is present, an image is mixed on a portion where the image is not originally seen, and a false image (hereinafter, a ghost) is viewed, thereby disturbing stereoscopic viewing and increasing tired feeling of the stereoscopic viewing.

An example of a stereoscopic display device, for combining directional backlight with a liquid crystal panel and providing stereoscopic display that enables stereoscopic viewing with naked eyes, is a stereoscopic display device disclosed in Japanese Patent Application Laid-Open No. 2001-66547 (FIG. 1). This stereoscopic display device has two light sources for focusing light to viewer's right and left eyes, turns on the light source for right eye in synchronization with display of a parallax image for right eye on the liquid crystal panel, turns on the light source for left eye in synchronization with display of a parallax image for left eye, and displays the right and left parallax images alternatively to display a stereoscopic image.

Factors of the crosstalk occurring in the stereoscopic display device in Japanese Patent Application Laid-Open No. 2001-66547 include two components. One of the components is a component, whose luminance of light emitted to a right-eye direction at the time when stray light is generated in backlight and a liquid crystal panel and the light source for left eye is turned on does not completely become zero (in the case of the light source for right eye, component whose luminance of light emitted to a left-eye direction does not completely become zero). The other component is a component that is generated by a response delay of the liquid crystal panel because the liquid crystal panel is driven in time division.

Since the component caused by the stray light in the factors of the crosstalk hardly changes even when the liquid crystal panel provides any display, a crosstalk amount simply becomes a value obtained by multiplying gradation luminance on an opposite side (namely, a parallax image for right eye shown at the time of display of a parallax image for left eye) by a constant. A signal processing method relating to crosstalk elimination/correction in such a case is disclosed (for example, see Japanese Patent Application. Laid-Open No. 2001-298754).

Japanese Patent Application Laid-Open No. 2001-298754 discloses a crosstalk correcting method in the case where the crosstalk amount is simply a constant-times larger, and this method cannot cope with the case where a complicated crosstalk amount such as liquid crystal delay occurs. Since the lowest luminance of an input image is raised to a level of a maximum crosstalk amount, entire contrast is remarkably deteriorated, and thus display quality is deteriorated.

SUMMARY OF THE INVENTION

It is an object of the present invention to provide a method for taking a complicated crosstalk amount caused by a response delay of liquid crystal into consideration, maintaining display quality as much as possible and reducing a crosstalk amount.

According to the present invention, a method for correcting stereoscopic images in which a stereoscopic image displayed based on a left image and a right image is corrected, includes (a) at least one of a step of inputting a left image and a right image and detecting a range of crosstalk and a crosstalk amount occurring on the left image or the right image as black-side correction data for crosstalk causing bright display based on crosstalk characteristic data obtained based on gradation of the left image and gradation of the right image, and a step of inputting the left image and the right image and detecting the range of crosstalk and the crosstalk amount as white-side correction data for crosstalk causing dark display based on crosstalk characteristic data obtained based on gradation of the left image and gradation of the right image, (b) at least one of a step of inputting the black-side correction data into a smoothing filter after the step (a), allowing the black-side correction data to have a smooth slope from an inside of the range where the crosstalk occurs to out of the range by the smoothing filter and making the black-side correction data into lower-limit data, and a step of inputting the white-side correction data into a smoothing filter after the step (a), allowing the white-side correction data to have a smooth slope from an inside of the range where the crosstalk occurs to an outside of the range by the smoothing filter, and making the white-side correction data into upper-limit data, (c) a step of gamma-converting the left image or the right image based on at least one of the lower-limit data and the upper-limit data after the step (b), and generating a corrected left image or a corrected right image.

According to the present invention, the device includes (a) at least one of a step of inputting a left image and a right image and detecting a range of crosstalk and a crosstalk amount occurring on the left image or the right image as black-side correction data for crosstalk causing bright display based on crosstalk characteristic data obtained based on gradation of the left image and gradation of the right image, and a step of inputting the left image and the right image and detecting the range of crosstalk and the crosstalk amount as white-side correction data for crosstalk causing dark display based on crosstalk characteristic data obtained based on gradation of the left image and gradation of the right image, (b) at least one of a step of inputting the black-side correction data into a smoothing filter after the step (a), allowing the black-side correction data to have a smooth slope from an inside of the range where the crosstalk occurs to an outside of the range by the smoothing filter and making the black-side correction data into lower-limit data, and a step of inputting the white-side correction data into a smoothing filter after the step (a), allowing the white-side correction data to have a smooth slope from an inside of the range where the crosstalk occurs to an outside of the range by the smoothing filter, and making the white-side correction data into upper-limit data, (c) a step of gamma-converting the left image or the right image based on at least one of the lower-limit data and the upper-limit data after the step (b), and generating a corrected left image or a corrected right image. For this reason, a complicated crosstalk amount caused by a response delay of liquid crystal is taken into consideration, the display quality is maintained as much as possible, and the crosstalk amount can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating one example of a timing chart when stray light is present in the backlight and a response of liquid crystal is delayed according to the first preferred embodiment of the present invention;

FIG. 6 is a diagram illustrating a sample image to be used for description according to the first preferred embodiment of the present invention;

FIG. 7 is a diagram illustrating luminance distribution in a lateral direction on a center position in an up-down direction of the sample image in FIG. 6 according to the first preferred embodiment of the present invention;

FIG. 8 is a diagram illustrating a change in the luminance in FIG. 7 when crosstalk that is caused by the backlight is present according to the first preferred embodiment of the present invention;

FIG. 9 is a diagram illustrating a change in the luminance in FIG. 7 when crosstalk that is caused by a response delay of the liquid crystal is present in addition to FIG. 8 according to the first preferred embodiment of the present invention;

FIG. 13 is a diagram illustrating a change in the luminance in FIG. 9 when the crosstalk is corrected according to the first preferred embodiment of the present invention;

FIG. 14 is a block diagram illustrating an overdrive process of the stereoscopic display device according to the first preferred embodiment of the present invention;

FIG. 17 is a diagram illustrating an image when the test image in FIG. 15 is displayed when the table of the overdrive of the stereoscopic display device indicates the initial value according to the first preferred embodiment of the present invention;

FIG. 18 is a diagram illustrating an image when the test image in FIG. 15 is displayed when the table of the overdrive of the stereoscopic display device is corrected according to the first preferred embodiment of the present invention;

FIG. 19 is a diagram illustrating a structure of the table when the image in FIG. 18 is converted into a gradation value according to the first preferred embodiment of the present invention;

FIG. 21 is a diagram illustrating a luminance difference in the table in FIG. 19 from gradation without crosstalk according to the first preferred embodiment of the present invention;

FIG. 22 is a diagram illustrating a structure of a B table to be used in a signal process in the case of FIG. 21 according to the first preferred embodiment of the present invention;

FIG. 23 is a diagram illustrating a structure of a W table to be used in the signal process in FIG. 21 according to the first preferred embodiment of the present invention;

FIG. 24 is a diagram illustrating corrected data values on white and black sides corresponding to an image position obtained from the input image shown in FIG. 6 according to the first preferred embodiment of the present invention;

FIG. 25 is a diagram illustrating white and black corrected data when a one-dimensional LPF process is performed on the corrected data on the white and black sides in FIG. 24 according to the first preferred embodiment of the present invention;

FIG. 26 is a diagram illustrating that the white and black corrected data in FIG. 25 is converted into upper limit and lower limit values to be inputted into a gamma converter according to the first preferred embodiment of the present invention;

FIG. 27 is a diagram illustrating operation contents of the gamma conversion according to the first preferred embodiment of the present invention;

FIG. 28 is a diagram illustrating gradation on a generated corrected image position according to the first preferred embodiment of the present invention;

FIGS. 30 to 32 are diagrams each illustrating one example of setting of a filter range in a two-dimensional filter according to the first preferred embodiment of the present invention;

DESCRIPTION OF THE PREFERRED EMBODIMENTS

Preferred embodiments of the present invention will be described below with reference to the drawings.

First Preferred Embodiment

Figure 1:
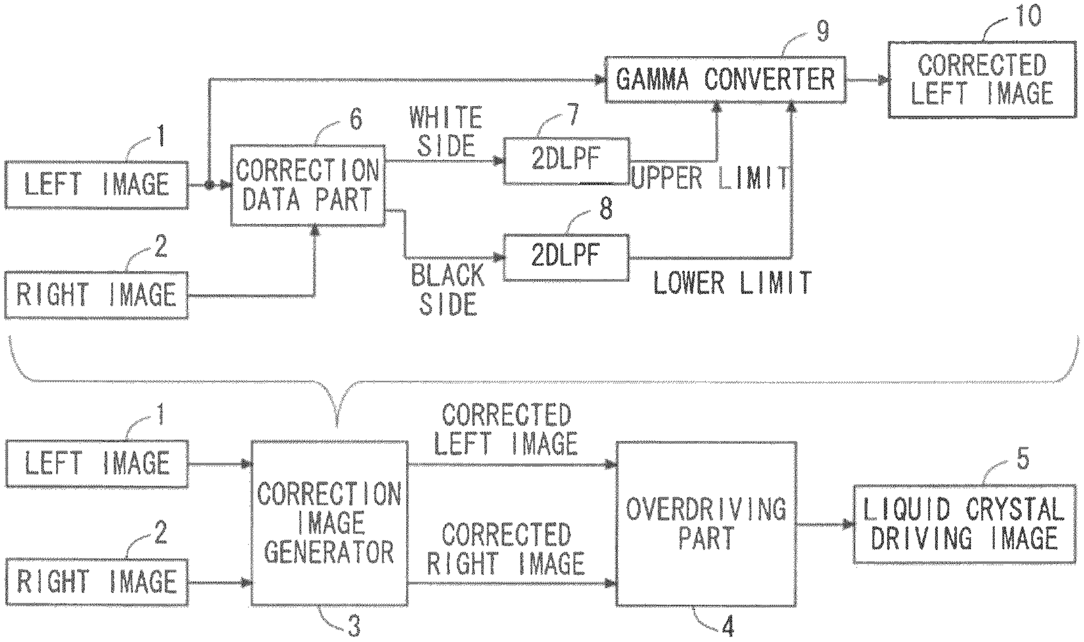
FIG. 1 is a block diagram illustrating a process for correcting and generating a stereoscopic image according to a first preferred embodiment of the present invention.

FIG. 1 is a block diagram illustrating a process for correcting and generating a stereoscopic image according to a first preferred embodiment of the present invention. As shown in FIG. 1, a left image 1 and a right image 2 are corrected by a correction image generator 3. After the corrected left image and right image undergo an overdrive process in an overdriving part 4, they are displayed as a liquid crystal driving image 5 and thus are stereoscopically displayed. The correction image generator 3 corrects a stereoscopic image displayed based on the left image 1 and the right image 2. A correction data part 6 detects a range of crosstalk and a crosstalk amount generated on the left image 1 or the right image 2 as black-side correction data where a low gradation side is a black side and as white-side correction data where a high gradation side is a white side based on crosstalk characteristic data (FIGS. 19 to 22, described later) obtained based on gradation of the inputted left image 1 and gradation of the inputted right image 2. The detected black-side correction data and the white-side correction data are inputted into 2DLPFs (two-dimensional low-pass filters) 7 and 8 (smoothing filters), and the black-side correction data and the white-side correction data are provided with smooth slopes from an inside of a range where the crosstalk occurs to an outside of the range by the 2DLPFs 7 and 8. As a result, the black-side correction data is lower limit data, and the white-side correction data is upper limit data. A gamma converter 9 gamma-converts the left image 1 or the right image 2 based on the lower limit data and the upper limit data obtained via the 2DLPFs 7 and 8, and generates a corrected left image 10 or a corrected right image (not shown). The process in the correction image generator 3 will be described in detail below.

Figure 2:
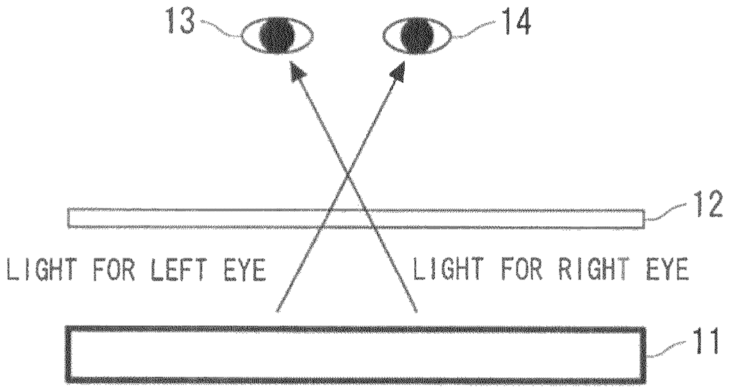
FIG. 2 is a diagram illustrating one example of a constitution of a stereoscopic display device according to the first preferred embodiment of the present invention.

FIG. 2 is a diagram illustrating one example of a constitution of the stereoscopic display device according to the first preferred embodiment of the present invention. As shown in FIG. 2, the stereoscopic display device has a directional backlight 11 and a liquid crystal panel 12, and a combination of the directional backlight 11 and the liquid crystal panel 12 provides stereoscopic display. The directional backlight 11 emits light only to a direction of a right eye 13 (light for right eye) and light only to a direction of a left eye 14 (light for left eye) separately by means of electric signals. Such a light emitting principle is a method described in Japanese Patent Application Laid-Open No. 2001-66547, for example, and this principle is realized by turning on any one of a light source for right eye and a light source for left eye. In another method, liquid crystal that opens and closes light into a slit shape between a backlight and a liquid crystal panel is combined with a slit, and an emitting direction of the light from light sources can be controlled. In the first preferred embodiment, since the constitution and the system of the stereoscopic display device are not considered, detailed descriptions thereof will not be given.

Figure 3:
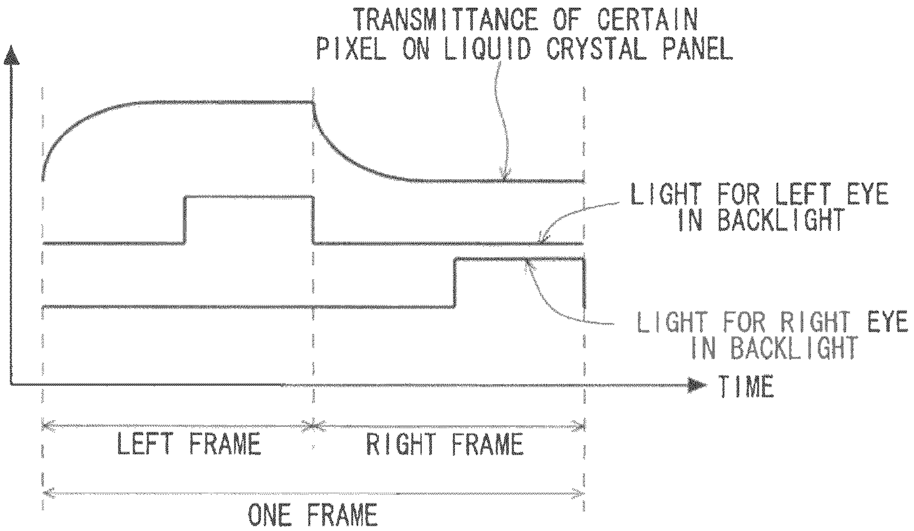
FIG. 3 is a diagram illustrating one example of an ideal timing chart of the stereoscopic display device according to the first preferred embodiment of the present invention.

A method for driving the liquid crystal panel and the backlight according to the above system will be described below. FIG. 3 illustrates one example of an ideal timing chart of the stereoscopic display device according to the first preferred embodiment of the present invention. As shown in FIG. 3, one frame is made of a left frame and a right frame. When driving of the left frame is started, an image for left eye is written on the liquid crystal panel. In the left frame shown in FIG. 3, a predetermined pixel is white display (luminance is high). In general, a response of liquid crystal on the liquid crystal panel is not so fast, and normally time of a several milliseconds is required. Therefore, when the liquid crystal responds sufficiently, it is necessary to turn on the backlight for left eye. On the other hand, on the right frame, an image for right eye is written onto the liquid crystal panel. On the right frame shown in FIG. 3, the predetermined pixel is black display (luminance is low). Similarly on the right frame, when the liquid crystal responds sufficiently, the backlight for right eye is turned on. When the operation on each frame is repeated at a high speed, different images can be displayed for right and left eyes (in the above case, the predetermined pixel is white display for left eye and black display for right eye). At this time, when a stereoscopic parallax image is displayed, the display can produce a stereoscopic effect.

Figure 4:
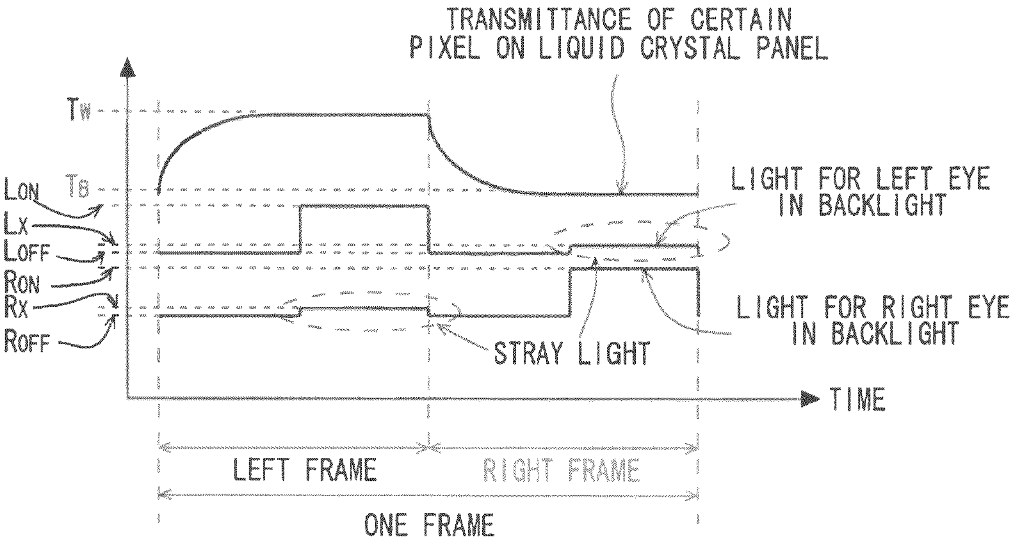
FIG. 4 is a diagram illustrating one example of a timing chart when stray light is present in backlight according to the first preferred embodiment of the present invention.

In an actual device using the above system, crosstalk occurs according to about two factors. The first factor is that stray light is emitted as light opposite to a desired side (a frame different from a desired frame) due to irregular reflection or the like in the directional backlight or the liquid crystal panel. FIG. 4 illustrates one example of a timing chart when stray light is present in the backlight according to the first preferred embodiment of the present invention. As is clear from a comparison between FIGS. 4 and 3, light for left eye emitted from the backlight is generated as stray light at the time when light for right eye is on. As a result, when backlight lighting times are equal to each other between the right and left frames, the light reaching a left eye has luminance that is proportional to:

$$T_w \times L_{ON} + T_B \times L_X \quad (1)$$

Similarly, the light reaching a right eye has luminance that is proportional to:

$$T_B \times R_{ON} + T_W \times R_X \quad (2)$$

It is ideal for the left eye that the right frame and the left frame have the same luminance as the luminance at the time of white display. The luminance at the time when the right frame and the left frame are white display is:

$$T_W \times L_{ON} + T_W \times L_X \quad (3)$$

and crosstalk of an amount:

$$T_W \times L_{ON} + T_B \times L_X - (T_W \times L_{ON} + T_W \times L_X) = (T_B - T_W) \times L_X \quad (4)$$

appears on the left frame. Similarly, an amount of crosstalk on the right frame is:

$$T_B \times R_{ON} + T_W - R_X - (T_B \times R_{ON} + T_B \times R_X) = (T_W - T_B) \times R_X \quad (5)$$

and since $T_W > T_B$, the left frame (white display) is displayed comparatively darkly, and the right frame (black display) is displayed comparatively brightly.

The second factor that causes the crosstalk is a response delay of the liquid crystal in the liquid crystal panel. In the stereoscopic display device adopting the time division system, since images are displayed by turning on and turning off the light sources, when one frame period is too long, big flicker is visually recognized. For this reason, a frequency of one frame is generally set to 60 Hz or more. With such a setting, a period of right and left sub-frames (left frame and right frame) becomes about 8 ms, and it is necessary for the liquid crystal to respond in a shorter time when taking into consideration stability of transmittance of the liquid crystal at the lighting period within this period of the right and left frames. FIG. 5 illustrates one example of a timing chart when stray light is present in the backlight according to the first preferred embodiment of the present invention and the response of the liquid crystal is delayed. In a waveform of the liquid crystal transmittance, a solid line shown in FIG. 4 is shown by a broken line for comparison. As shown in FIG. 5, when the response of the liquid crystal is delayed, average transmittances of the liquid crystal for the lighting periods of the right and left frames are not $T_W$ and $T_B$, but becomes $T_{BW}$ and $T_{WB}$. When transmittance at the time when both the right and left frames are white display and transmittance at the time when both the right and left frames are black display are $T_{WW}$ and $T_{BB}$, respectively, the amount of the crosstalk on the left frame becomes:

$$T_{BW} \times L_{ON} + T_{WB} \times L_X - (T_{WW} \times L_{ON} + T_{WW} \times L_X) \quad (6)$$

Similarly, the amount of the crosstalk on the right frame becomes:

$$T_{WB} \times R_{ON} + T_{BW} \times R_X - (T_{BB} \times R_{ON} + T_{BB} \times R_X) \quad (7)$$

If the amount of the crosstalk in the equations (6) and (7) is to be set to 0, since $T_{BW}$, $T_{WB}$, $L_{ON}$, $L_X$, $R_{ON}$, and $R_X$ are constants determined by an ability of the display device, variable amounts become $T_{WW}$ and $T_{BB}$, and they may be set as follows:

$$T_{WW} = (T_{BW} \times L_{ON} + T_{WB} \times L_X)/(L_{ON} + L_X) \quad (8)$$

$$T_{BB} = (T_{WB} \times R_{ON} + T_{BW} \times R_X)/(R_{ON} + R_X) \quad (9)$$

In the equation (8), since $T_{WB} \times L_X \ll 1$, it is necessary to set the variable amount to be darker than $T_{BW} \times L_{ON}$ at ratio of $L_{ON}/(L_{ON}+L_X)$. In the equation (9), it is necessary to mainly set the variable amount to be brighter than $T_{WB} \times R_{ON}$ by $T_{BW} \times R_X/(R_{ON}+R_X)$. Since responsiveness of the liquid crystal greatly changes due to changing gradation and temperature, it is practically difficult to simply make a correction using such functions.

The above description is explained by using an image that is actually displayed. FIG. 6 is a diagram illustrating a sample image to be used for the description according to the first preferred embodiment of the present invention. As shown in FIG. 6, a left side shows an image for left eye (hereinafter, left frame image), and a right side shows an image for right eye (hereinafter, right frame image). On both of the right and left frame images, a white window is drawn on a black background, but a relative position of the window differs between the right and left frame images. FIG. 7 is a diagram illustrating luminance distribution in a lateral direction (X direction) on a center position in an up-down direction of the sample image in FIG. 6 according to the first preferred embodiment of the present invention. An upper stage in FIG. 7 shows the luminance distribution of the left frame image, and a lower stage shows luminance distribution of the right frame image. As shown in FIG. 7, the position of the white window differs between the right and left frame images.

FIG. 8 is a diagram illustrating a change in the luminance with respect to FIG. 7 when the crosstalk that is caused by the backlight is present according to the first preferred embodiment of the present invention. In FIG. 8, for ease of description, regions are defined by 1, 2, 3, 4 and 5 beginning from the left. A thick line in FIG. 7 is shown by a broken line. An area where the left frame image is white display and the right frame image is black display is a region 4. Since the liquid crystal is ideal in FIG. 8, when $T_B$ in the equations (1) and (2) is 0, luminance on the left frame image becomes $T_W \times L_{ON}$, and this matches with the luminance in FIG. 7. On the other hand, the luminance on the right frame image becomes $T_W \times R_X$, and $T_W \times R_X$ does not become 0 as long as $R_X$ is not 0. A crosstalk seems to be not present on the left frame image in the region 4 according to the equation (1), but since the crosstalk occurs in comparison to the region 3 represented by the equation (3), the crosstalk occurs by an amount represented by the equation (4). Further, crosstalk occurs by an amount represented by the equation (5) on the right frame image in comparison to the region 5. The amount of the crosstalk is a difference in the luminance in the same display gradation of adjacent regions.

Figure 10:
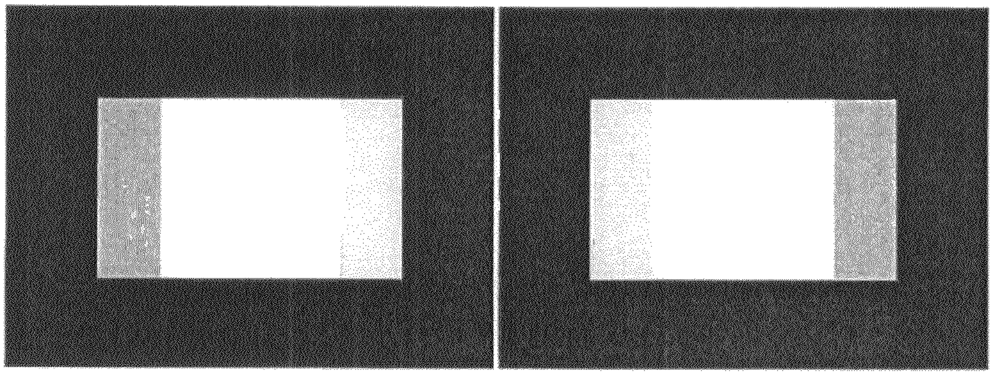
FIG. 10 is a diagram illustrating a sample image only in the case of the luminance in FIG. 9 according to the first preferred embodiment of the present invention.

FIG. 9 is a diagram illustrating a change in the luminance with respect to FIG. 7 when the crosstalk that is caused by a response delay of the liquid crystal in addition to FIG. 8 according to the first preferred embodiment of the present invention. FIG. 9 corresponds to the equations (6) and (7). A broken line in FIG. 9 shows the thick line of FIG. 7. As shown in FIG. 9, when an attention is paid to the region 4, the luminance matches with the broken line in FIG. 8 on the left frame image, but the luminance shifts below from the broken line in FIG. 8 due to the response delay of the liquid crystal. The luminance on the right frame image rises more than that in FIG. 8. A difference between FIGS. 8 and 9 is presence or non-presence of the response delay of the liquid crystal, but the crosstalk is further deteriorated due to the response delay of the liquid crystal. FIG. 10 illustrates an image in the case of the luminance in FIG. 9.

Figure 11:
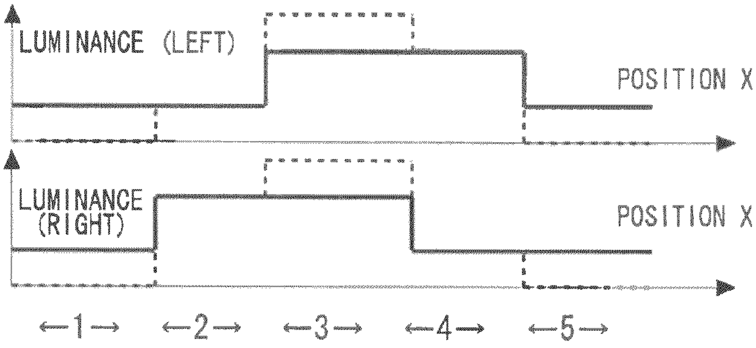
FIG. 11 is a diagram illustrating a change in the luminance in FIG. 9 when the crosstalk is corrected by contrast suppression.
Figure 12:
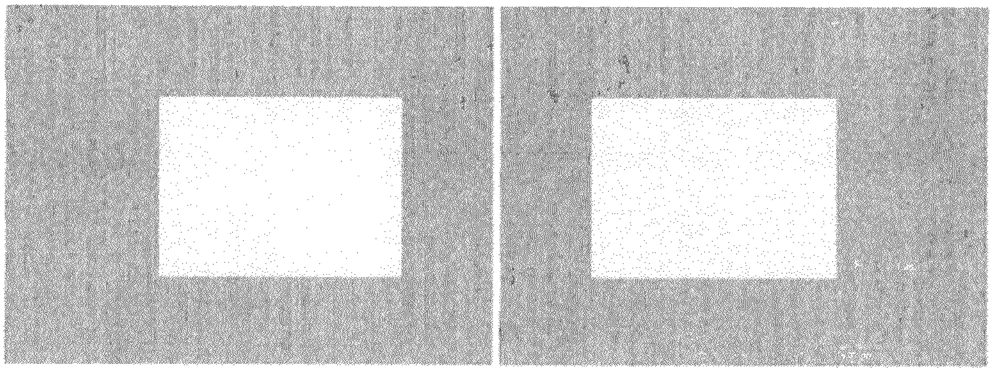
FIG. 12 is a diagram illustrating a sample image in the case of the luminance in FIG. 11.

In order to eliminate the crosstalk according to a signal operating process, for example, the transmittance of the liquid crystal on the left frame image may be set higher on the region 4, and the transmittance of the liquid crystal on the right frame image may be set lower. However, the transmittance cannot be set to a value that excesses a maximum transmittance of the liquid crystal panel or a negative value. Therefore, the difference in the luminance in the same display gradation between the adjacent regions is practically set to 0. The luminance distribution at this time is shown in FIG. 11. As shown in FIG. 11, a broke line shows the thick line in FIG. 9. Since the luminance on the left frame image cannot be heightened and the luminance on the right frame image cannot be lowered on the region 4, the luminance on the region 3 of the left frame image is set according to the equation (8), and the luminance on the region 5 of the right frame image is set according to the equation (9). Similarly, when the luminance on the regions 1, 3 and 5 of the right and left frame images is set, the luminance distribution is as shown in FIG. 11. When the luminance distribution shown in FIG. 11 is shown as an image, an image in FIG. 12 is displayed. As shown in FIG. 12, the crosstalk is completely eliminated, but the contrast between white luminance and black luminance is remarkably lowered, and thus deterioration in the quality of the entire image cannot be avoided.

It is, therefore, an object of the present invention to obtain an image having luminance distribution as shown in FIG. 13. As shown in FIG. 13, since the luminance on the regions 4 and 2 cannot be heightened (or lowered) on both the right and left frame images, the luminance on adjacent regions corresponding to the same display gradation is changed smoothly from a crosstalk level to a maximum contrast level. As a result, an outline of a ghost created by the crosstalk is made to be obscure and thus difficulty recognized. This utilizes a property such that human's eyes are sensitive to a rapid change in luminance and chromaticity but are insensitive to a gentle change. An image signal process for obtaining an image exhibiting the luminance distribution shown in FIG. 13 from the corrected image will be described below.

A well-known overdrive technique is used in normal liquid crystal display devices and stereoscopic display devices of field sequential type. FIG. 14 is a block diagram illustrating an overdrive process of the stereoscopic display device according to the first preferred embodiment of the present invention. As shown in FIG. 14, since the left image 15 and the right image 16 are written into the liquid crystal alternatively, while the left image 15 is being written into the liquid crystal (current image is the left image 15), a state of the liquid crystal before the writing process is the right image 16 (previous image is the right image 16). While the right image 16 is being written into the liquid crystal (current image is the right image 16), a state of the liquid crystal before the writing process is the left image 15 (previous image is the left image 15). The left image 15 and the right image 16 are selected for the right and left frames, respectively by frame selection 17, and are inputted into an overdrive (table) 18. In the case of a moving image, in a frame structure starting from the left as shown in FIG. 3, the right image 16 of a previous frame is used as a reference on the left frame (left image 15), and the left image 15 of the same frame is used as a reference on the right frame (right image 16). Although not shown in FIG. 6, since the image of one frame before is used as a reference as described above, image data is once saved in a delay unit such as a frame memory and thus the image data is timed, thereby realizing the overdrive. The image undergone the overdrive process is displayed as a liquid crystal driving image 19 on the display device.

The overdrive process can be performed by using any function, but a method using a lookup table is the easiest in order to cope with complicated characteristics of a device. For example, in a case of a liquid crystal device of 8-bit gradation, when a table of 256 (current image)×256 (previous image) is present, the process can cope with any characteristics, but generally the number of values in the table is thinned out to a certain level in order to reduce resources of the device. At this time, intermediate data that is not present in the table is created by interpolation. The table enables a simple correcting process without taking complicated logical mathematical formulas into consideration.

Figures 15, 16:
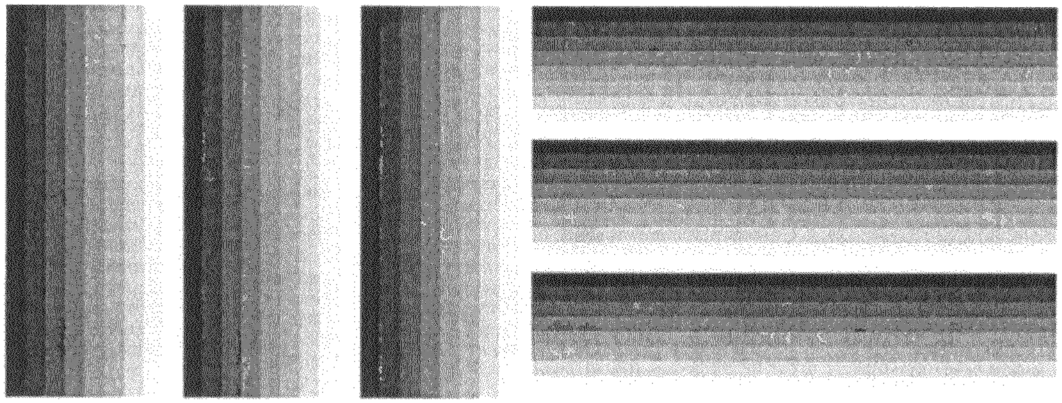
FIG. 15 is a diagram illustrating a test image for creating a table of the overdrive of the stereoscopic display device according to the first preferred embodiment of the present invention.
FIG. 16 is a diagram illustrating a structure of the table when the table of the overdrive of the stereoscopic display device indicates an initial value according to the first preferred embodiment of the present invention.

A concrete method for creating table data to be used in the overdrive process will be described. It is considered that in the liquid crystal device of 8-bit gradation, table values are set at 32-gradation intervals (9 gradation-intervals of 0, 32, 64, 96, 128, 160, 192, 224 and 255). This is one example, and thus a number of divisions may be increased according to target accuracy. FIG. 15 is a diagram illustrating a test image for creating the table of the overdrive in the stereoscopic display device according to the first preferred embodiment of the present invention. As shown in FIG. 15, on the left frame image on a left side, nine gradation bars are arranged from the left. On the right frame image on the right side, nine gradation bars are arranged from above. In order to easily compare the right and left frame images, the gradation bars are displayed on the right and left frame images repeatedly for three times. Initial values of the table are set as shown in FIG. 16. As shown in FIG. 16, since the nine gradation intervals are set, the table consists of 81 data (9×9). In the table shown in FIG. 16, the same value is set in a column direction (namely, current gradation), and the values do not dependent on values of previous gradation. In other words, this corresponds to a case without overdrive.

FIG. 17 is a diagram illustrating an image when the test image in FIG. 15 is displayed when the table of the overdrive in the stereoscopic display device indicate the initial values according to the first preferred embodiment of the present invention. As shown in FIG. 17, the right and left frame images are different from the images shown in FIG. 15 due to an influence of the crosstalk caused by the stray light of the backlight and the response delay of the liquid crystal. Therefore, when the values of the table shown in FIG. 16 is suitably adjusted, not only the overdrive of the liquid crystal but also the crosstalk including stray light in the backlight can be corrected. Shaded diagonal components shown in FIG. 16 are the case where the previous gradation is the equal to the current gradation. That is, this means that the gradations on the right and left frame images in a stereoscopic image are equal to each other. Therefore, in order to reduce the influence of the crosstalk, the diagonal components in FIG. 16 are fixed, and the other table elements are adjusted within a range of 0 to 255. The adjusting method includes a visual method and a luminance measuring method, but the adjustment can be sufficiently made even by the visual method.

An attention is paid to the left frame image here, and the table values shown in FIG. 16 are adjusted to be set based on the luminance of the display part corresponding to the diagonal components so that the luminance is constant in a longitudinal direction. For example, on the current gradation 128 and previous gradation 128, the luminance just on a center of the display part is obtained, but an upper side with respect to the center is slightly dark. For this reason, the value in the table corresponding to the current gradation 128 and the previous gradation 96 is not 128 but 135, that is, set to a slightly higher value. On the other hand, since a lower side with respect to the center is slightly bright, the value in the table corresponding to the current gradation 128 and the previous gradation 160 is set to 110 that is a slightly lower value. Such a setting is performed sequentially in the longitudinal direction, and the constant luminance is set in the longitudinal direction shown in FIG. 17.

When the left frame image is adjusted, the right frame image is also automatically adjusted so that the luminance is constant in a lateral direction. However, as to the longitudinal line of the current gradation 255, the components other than the diagonal components are displayed with lower luminance than that of the diagonal components as shown in FIG. 17, but all the values in the table are 255 and thus the values cannot be set to higher values. Similarly, as to the longitudinal line of the current gradation 0, the components other than the diagonal components are displayed brighter as shown in FIG. 17, but since all the values in the table are 0, the values cannot be set to lower values. Therefore, even when the gradation is 0 or 255, a region that is saturated and cannot be set is present.

FIG. 18 illustrates an image that is adjusted within a settable range and is obtained. As shown in FIG. 18, when an attention is paid to the left frame image, it is found that the crosstalk is eliminated on the fourth to eighth longitudinal lines from the left. Since the table values on the first to third and ninth longitudinal lines from the left are saturated, the crosstalk remains. If the crosstalk is eliminated by using only such an overdrive table, not the gradations 0 to 255 but the gradations 64 to 224 corresponding to the fourth to eighth lines are used on the diagonal components in the table shown in FIG. 16, and for example, 64, 68, 82, 101, 123, 148, 173, 199 and 224 may be set sequentially from upper left in the table. With such a setting, all the components in the table are not saturated and can be set. However, such a setting is similar to performing the process shown in FIGS. 11 and 12, and the black luminance is not 64 or less and the white luminance is not 244 or more, thereby deteriorating the quality of the entire image.

In the first preferred embodiment, the overdriving part 4 shown in FIG. 1 performs the overdrive process by correcting to the display state shown in FIG. 18, and thus the visibility of a ghost due to the crosstalk is reduced. An image signal inputted into the overdriving part 4 is generated by a correction image generator 3 shown in FIG. 1.

Figure 20:
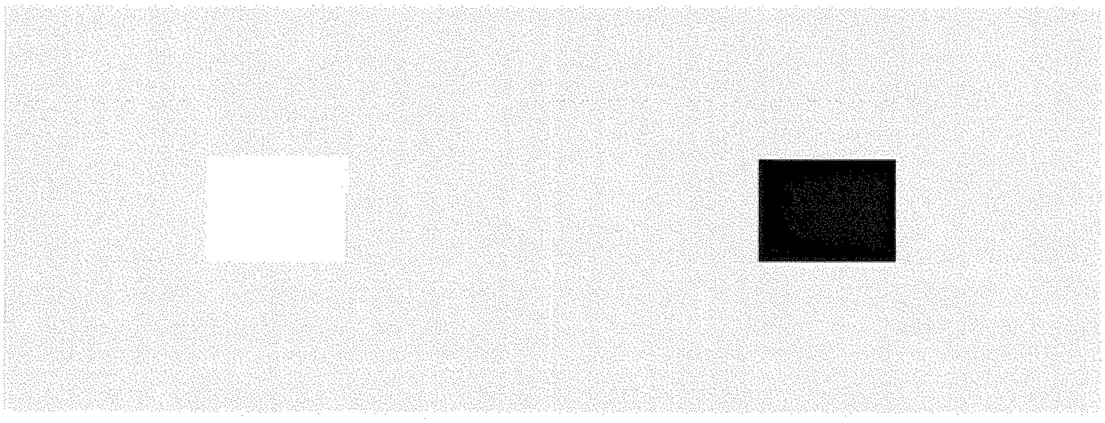
FIG. 20 is a diagram illustrating one example of a test image to be used for visually creating the table in FIG. 19 according to the first preferred embodiment of the present invention.

Before the process in the correction image generator 3 in FIG. 1, necessary data is created. The luminance of the image shown in FIG. 18 corresponding to cells (81 cells) in the table shown in FIG. 16 is optically measured or visually compared with any reference gradation, and data is created by the luminance and corresponding gradation (the same gradation between right and left). In the visual comparing method, the comparison is made by using a test pattern shown in FIG. 20, for example. As shown in FIG. 20, the left frame image is on a left side, and the right frame image is on a right side. Center windows are on the same position, the center window on the left frame image has 255 gradation, and the center window on the right frame image has 0 gradation. Backgrounds of the right and left frame image have the same gradation and the gradation is variable. The stereoscopic display device displays the image shown in FIG. 20, and for example, when the left frame image is viewed, the 255 gradation region on the center window is slightly dark due to a crosstalk. At this time, the gradation of the background is changed, and when brightness of the background is approximately the same as that of the center window, the gradation of the background can be used as the data. FIG. 19 illustrates a table of the created data about the image shown in FIG. 18. The creation of the data is not made to be strict, and a slight deviation from the overdrive correction particularly in the intermediate gradation regions may be regarded as 0. The table in FIG. 19 is exactly like the overdrive table, but the table shown in FIG. 19 shows the measured data. In order to make the table shown in FIG. 19 easily understandable, FIG. 21 illustrates a table in which a difference with respect to the diagonal components is obtained in a column direction. When the image shown in FIG. 18 is compared with the table shown in FIG. 21, a portion of the image in FIG. 18 displayed darkly indicates a negative value, a portion displayed brightly indicates a positive value, and a portion without a crosstalk indicates 0. For later operation, the current gradation in FIG. 21 is defined as X and data about any cell is defined as Z, and two tables (B table and W table) are created according to the following equations:

$$B \text{ table: when } Z \le 0\text{, the value is 0, and otherwise, } Z \times 255/(255-X) \quad (10)$$

$$W \text{ table: When } Z \ge 0\text{, the value is 0, and otherwise, } -Z \times 255/X \quad (11)$$

FIG. 22 illustrates the B table obtained according to the equation (10), and FIG. 23 illustrates the W table obtained according to the equation (11). In the equations (10) and (11), Z is not set when Z is other than 0 because when gamma conversion, described later, is performed, a corrected gradation value of pixel where Z is other than 0 becomes Z.

A correcting process in the correction image generator 3 shown in FIG. 1 will be described below. FIG. 1 is a block diagram where the left image 1 (left frame image) is corrected, but the right image 2 (right frame image) is also corrected similarly. The correction data part 6 separates the left image 1 and the right image 2 inputted into the correction image generator 3 into corrected data (white-side correction data) on a white side (high-gradation side) and corrected data (black-side correction data) on a black side (low-gradation side). When pieces of the corrected data are created, the B table and the W table are used. Actually, it is taken into consideration that the display device provides color (RGB) display, and when gradation values for respective colors on the right and left images are determined as ($R_L$, $G_L$, $B_L$), and ($R_R$, $G_R$, $B_R$), the following six values are calculated:

$$BR_L = B\ \text{table}(R_L, R_R) \quad (12)$$

$$BG_L = B\ \text{table}(G_L, G_R) \quad (13)$$

$$BB_L = B\ \text{table}(B_L, B_R) \quad (14)$$

$$WR_L = W\ \text{table}(R_L, R_R) \quad (15)$$

$$WG_L = W\ \text{table}(G_L, G_R) \quad (16)$$

$$WB_L = W\ \text{table}(B_L, B_R) \quad (17)$$

The parentheses in the equations (12) to (17) represent (current gradation, previous gradation), and for example, when $R_L$=32 and $R_R$=224, the B table ($R_L$, $R_R$)=54 according to FIG. 22.

Maximum values of ($BR_L$, $BG_L$, $BB_L$) and ($WR_L$, $WG_L$, $WB_L$) calculated in such a manner are black-side correction data and white-side correction data, respectively. These values are calculated for each pixel, and distribution (luminance distribution) of the corrected data on a cross-section on the center of the input image shown in FIG. 6 is as shown in FIG. 24. As shown in FIG. 24, a broken line indicates the thick line in FIG. 9. Both upper and lower stages of FIG. 24 show only the left images, the upper stage shows the white-side correction data, and the lower stage shows the black-side correction data. The white-side correction data shows a darkly displayed portion where crosstalk occurs and a level of the crosstalk, and the black-side correction data shows a brightly displayed portion where crosstalk occurs and a level of the crosstalk.

The white-side correction data and the black-side correction data calculated for each pixel are inputted into the 2DLPFs 7 and 8 shown in FIG. 1. For simple description, a case where a one-dimensional low-pass filter is used will be described with reference to FIG. 24. A few kinds of LPFs are present, but an LPF using an equation (18) will be described here. A position is defined as X, the white-side correction data on the position X is defined as Y(X), and an LPF operation Z(X) on the position X is defined according to the following equation (18):

[Formula 1]

$$Z(X) = \mathrm{Max}\left(\frac{1}{N+1}\sum_{i=X}^{X+N} Y(X) \cdot \frac{1}{N+1}\sum_{i=X-N}^{X} Y(X)\right) \quad (18)$$

In the equation (18), a maximum value of not simple LPF but LPF in different areas is adopted. This means that larger one of an average from the position X to Nth pixel on the rightward side with respect to the position X and an average from the position X to Nth pixel on the leftward side with respect to the position X is adopted. When the right and left averages are calculated, a determination may be made whether the position X is included or what value is set for N according to a level of the final corrected result. When the similar operation is performed on the blacks-side corrected data, FIG. 24 is changed into FIG. 25.

The white-side correction data and the black-side correction data that underwent the process by means of LPF and are obtained for each pixel are inputted as an upper limit value (the equation (19)) and a lower limit value (the equation (20)) into the gamma converter 9 in FIG. 1. A value that is subtracted from 255 is used for the white-side correction data.

$$\text{Upper limit}=255-\text{white-side correction data(LPF)} \tag{19}$$

$$\text{Lower limit}=\text{black-side correction data(LPF)} \tag{20}$$

When the equations (19) and (20) are plotted, the results are as shown in FIG. 26.

The gamma converter 9 performs an operation according to the following equation (21) using an inputted image (left image in FIG. 1) X, an upper limit value and a lower limit value on a corresponding screen coordinate.

$$\text{Gamma output}=\text{lower limit}+(\text{upper limit}-\text{lower limit})\times X\div 255 \tag{21}$$

Contents of the operation of the equation (21) are shown in FIG. 27. In FIG. 27, the upper limit value and the lower limit value are set, and this means that the contrast is set to the upper limit/lower limit. In a strict sense, since the image signal is not proportional to the output luminance, the measured contrast is different from this definition but it means contrast at a level of an input signal. The equation (21) includes division by 255, but in order to reduce an operating amount at the time of forming hardware, the equation (19) may be:

$$\text{Upper limit}=256-\text{white-side correction data(LPF)} \tag{22}$$

and the equation (21) may be:

$$\text{Gamma output}=\text{lower limit}+(\text{upper limit}-\text{lower limit})\times X\div 256 \tag{23}$$

When the operation is performed on an image signal (for example, the upper stage in FIG. 7) inputted into the gamma converter 9 based on the upper limit value and the lower limit value shown in FIG. 26, the result is as shown in FIG. 28.

The maximum gradation in FIG. 6 should be originally inputted into the region 4 shown in FIG. 28, but even when the maximum gradation is inputted, display with the luminance of constant value or more cannot be provided. For this reason, the image gradation drops to the maximum value that can be outputted. The image gradation is gradually raised according to transfer from the region 4 to the region 3. On the region 3, higher luminance can be outputted, but when the luminance is abruptly raised, an edge of a ghost is visually recognized, and thus the luminance is gradually raised. On the other hand, when transferring from the region 4 to the region 5, an influence of crosstalk is not present, the gradation on the region 5 is abruptly changed so as to obtain an original edge, and lowest gradation is outputted on the region 5. When transferring from the region 3 to the region 2, the gradation is changed abruptly to the gradation on the region 2 so as to obtain an original edge. As the gradation on the region 2, the lowest gradation should be originally inputted, but even when the lowest gradation or lower is set, no change is seen, and thus the gradation is changed into the lowest value that can be outputted. When transferring from the region 2 to the region 1, the gradation is gradually changed, and finally into the lowest value. Since this region originally has no edge, visual recognition of an edge of a ghost is made to be difficult. When the corrected image shown in FIG. 28 is inputted into the overdriving part 4, only a place shown in FIG. 20 where the crosstalk is 0 is basically used, and thus exact display of the corrected image can be obtained. Therefore, when the above operation is performed on the inputted left image 1 and right image 2 and the obtained corrected image is displayed, the image shown in FIG. 13 is displayed.

Figure 29:
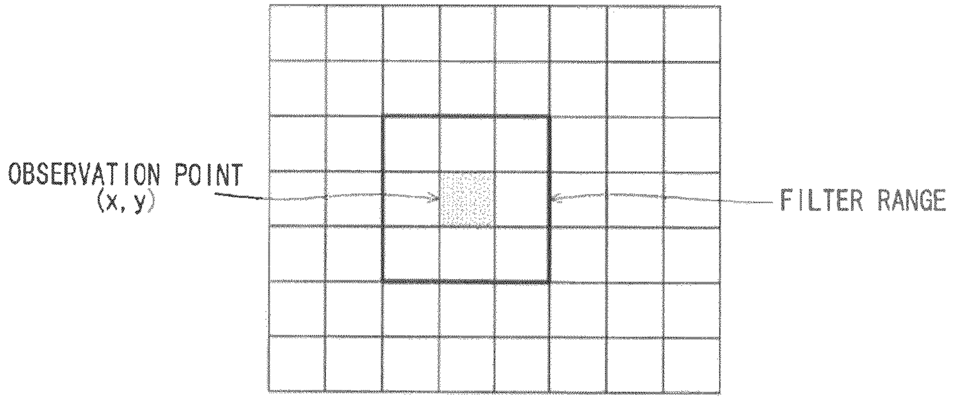
FIG. 29 is a conceptual diagram illustrating a two-dimensional filter in a general image process.

The two-dimensional LPF obtained by extending the LPF represented by the equation (18) two-dimensionally will be described below. FIG. 29 is a conceptual diagram illustrating a two-dimensional filter in a general image process. A general formula of the filter is as shown in the following equation (24):

[Formula 2]

$$f'(x, y) = \sum_{i=X0}^{X1}\sum_{j=Y0}^{Y1} f(x+i, y+j)\times a(i, j) \Bigg/ \sum_{i=X0}^{X1}\sum_{j=Y0}^{Y1} |a(i, j)| \tag{24}$$

In the equation (24), f( ) represents data for each pixel, and a( ) represents a filter constant. The simple LPF is an averaging filter, and i and j in a(i, j) are positive numbers that are not 0 and are constant. In FIG. 29, the operation is performed on data of surrounding 9 pixels including an observation point (x, y). In this preferred embodiment, a sufficient effect is produced by using the averaging falter. In the equation (18), average maximum values of right and left areas with respect to the observation point are obtained, but the operation is performed as follows in two-dimension.

Figure 30:
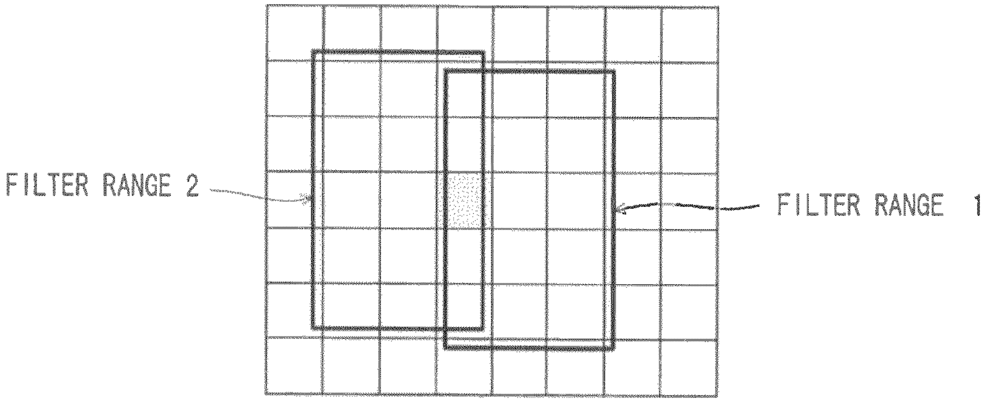

(A) In FIG. 30, (two) averages on the right and left areas of the observation point are calculated. The maximum value of the calculated two average values is obtained.

(B) In FIG. 31, averages on four areas on the diagonal direction with respect to the observation point are calculated. The maximum value of the calculated four average values is obtained.

(C) In FIG. 32, averages on four areas in the up-down and right-left directions with respect to the observation point are calculated. The maximum value of the calculated four average values is obtained.

(D) The maximum value of the averages on the eight portions of the areas shown in FIGS. 31 and 32 is obtained.

In (A) to (D), the operating amount is the largest in (D), but the operated result is the most accurate. "The operated result is accurate" means that a result of the correction of many images is accurate, and artifact due to the correction difficulty occurs. Besides the above, since many kinds of combinations of methods such as a change in weighting of a (i, j) in the equation (24) are present, an optimum filter may be determined by experiment. In the 2DLPFs 7 and 8, a periphery of a pixel to be processed is divided into a plurality of areas, and the process is performed by using the maximum value of absolute values in the black-side correction data or the white-side correction data that are smoothed in each area as the lower limit data or the upper limit data. The areas may include or exclude the pixel to be processed.

Since sizes of the x and y directions in the two-dimensional filter are slope widths of the corrected image shown in FIG.

28, when the sizes are too small, the slopes become precipitous, and an effect for obscuring an edge of a ghost is deteriorated. Further, when the sizes are too large, the operating amount is bloated and averaged on a wide area, and thus an effect for correcting crosstalk on a narrow area is deteriorated. Therefore, as a measure of determination as to the sizes of the x and y directions in the two-dimensional filter, the sizes of the x and y directions may be set within a minimum range where the worst effect for obscuring a crosstalk edge is produced. The larger the amount of worst crosstalk becomes, the greater the luminance changes, and thus a wider range is required. Normally, the worst crosstalk is obtained when a white window is displayed on a black background.

Figure 33:
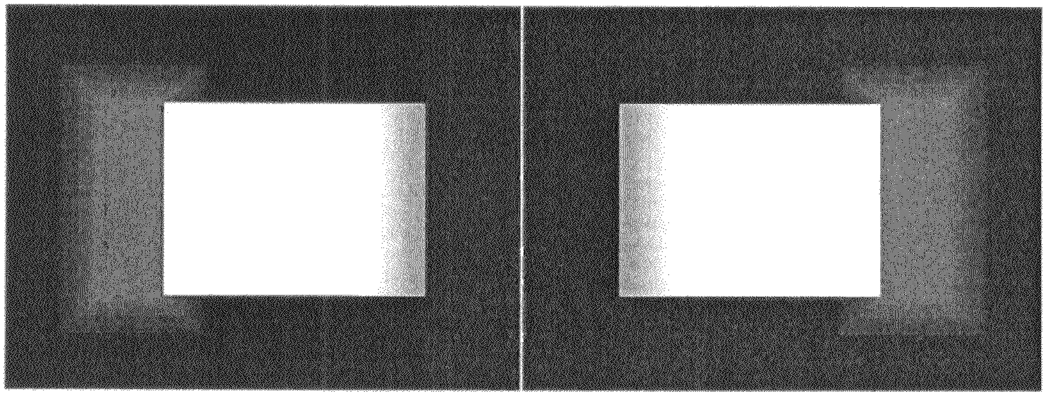
FIG. 33 is a diagram illustrating an image on which the correcting process in the first preferred embodiment is performed on the sample image in FIG. 6 according to the first preferred embodiment of the present invention.

FIG. 33 is a diagram illustrating an image after the correcting process according to the first preferred embodiment is performed on the image signal in FIG. 6. When this image is compared with the image in FIG. 10 that is not corrected, it is found that an edge of a ghost is difficulty recognized. Because of a worst case where a white window is displayed on a black background, a slight ghost is visually recognized, but the ghost is not clearly displayed as shown in FIG. 10. For this reason, a viewpoint is easily moved to an image to be originally displayed, and thus stereoscopic viewing becomes easy. If a person can stereoscopically view the drawing according to a parallel method or an intersection method under direct vision, the person will be uncertain particularly where the width of the window is on the image shown in FIG. 10. However, in the case of an image shown in FIG. 33, the window should be able to be certainly specified. As a result of actually correcting a lot of photographic images where crosstalk occurs according to the first preferred embodiment, improvement of the stereoscopic visibility is confirmed on most of the corrected images. Although contrast is locally lowered, original contrast of a device is obtained in a vicinity of a region where crosstalk does not occur or crosstalk is less, and the deterioration in the quality of the entire display is reduced.

The first preferred embodiment describes the liquid crystal display device using the directional backlight as an example, but the present invention can be applied to, for example, a system that performs field sequential driving on a liquid crystal panel using shutter eyeglasses. This is because when stray light in the backlight is replaced by leakage light from the shutter, the correction can be made based on the same principle as that in the first preferred embodiment. When the directional backlight is used, this can be used as a double-screened display device depending on a separating angle (displays different images according to a viewing angle). The correction according to the first preferred embodiment can be applied also in this case.

Figure 34:
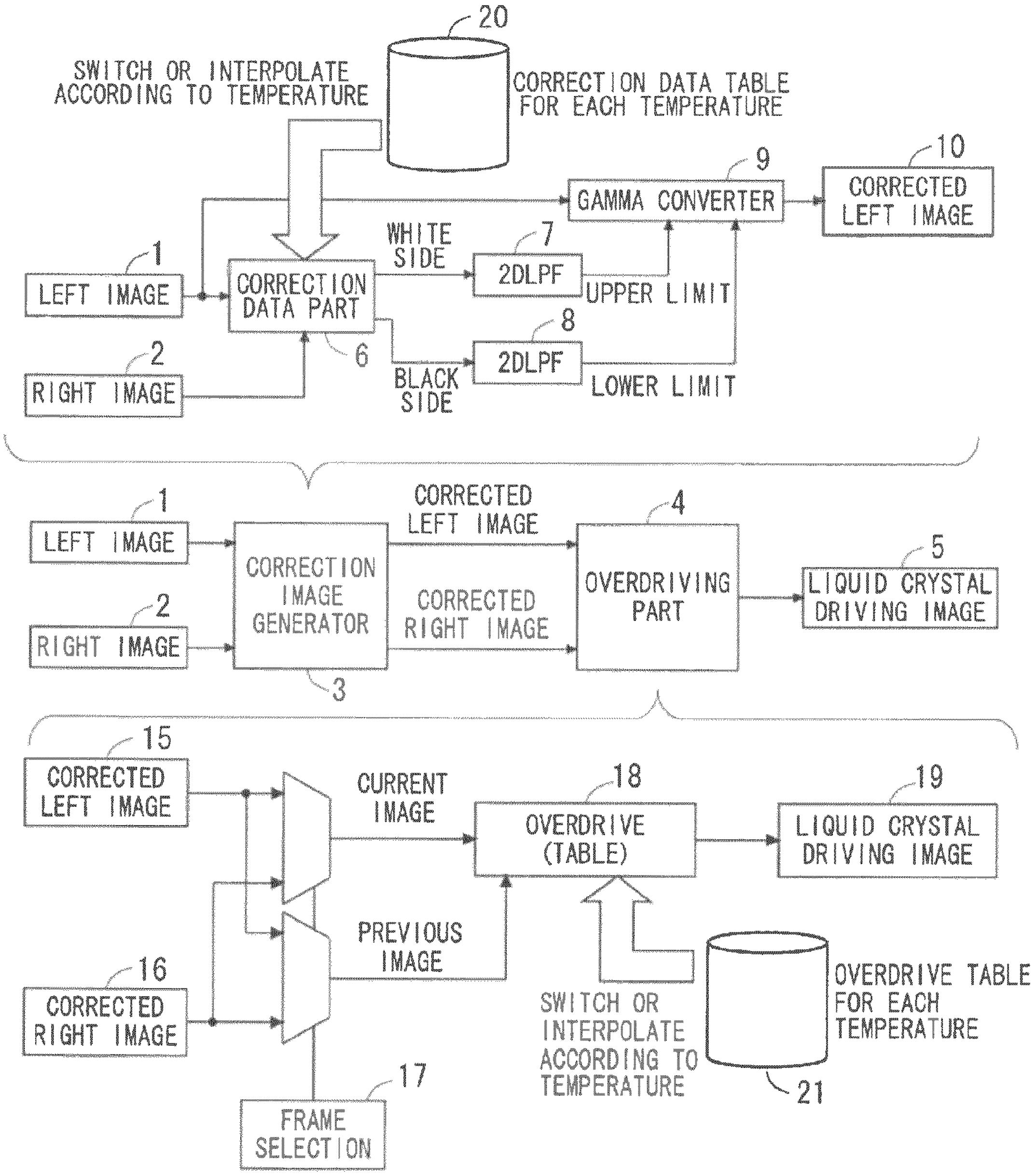
FIG. 34 is a block diagram illustrating correction to be performed on FIG. 1 with a characteristic change due to temperature being taken into consideration according to the first preferred embodiment of the present invention.

Since a response performance of the liquid crystal panel greatly changes due to temperature, when a temperature range of a usage environment is wide, the device has a temperature sensor, and table values of the overdrive are frequently rewritten according to the temperature. In the first preferred embodiment, as shown in FIG. 34, when the temperature of a usage environment is taken into consideration, a corrected data table 20 according to temperature is created (the entity is in FIGS. 22 and 23) similarly to the creation of the overdrive table 21 according to the temperature. Corrected data values to be used are rewritten according to the temperature similarly to the overdrive table 21.

Figure 35:
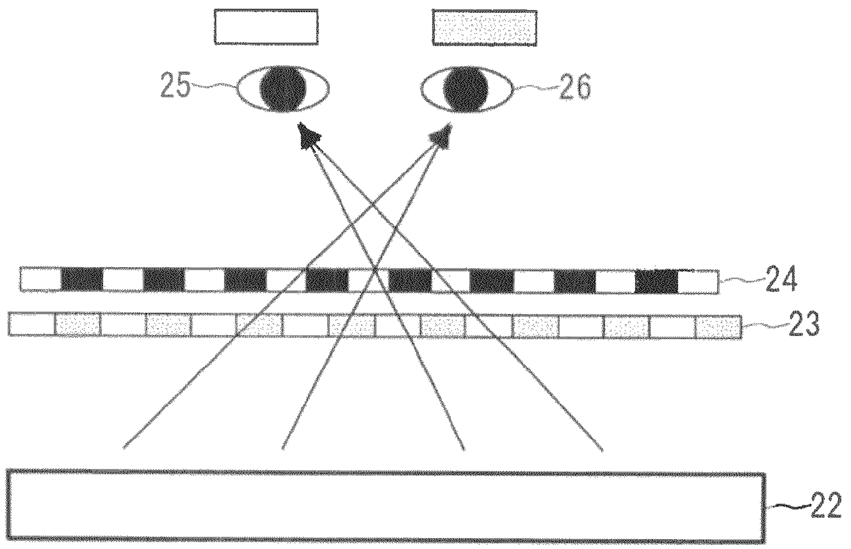
FIG. 35 is a diagram illustrating one example of the constitution of the stereoscopic display device according to the first preferred embodiment of the present invention.

FIG. 35 is a diagram illustrating one example of the constitution of the stereoscopic display device according to the first preferred embodiment. As shown in FIG. 35, the stereoscopic display device has a constitution such that the parallax barrier 24 is provided on a front surface (or a rear surface) of the liquid crystal panel 23, and an image for left eye 26 and an image for right eye 25 are displayed on the liquid crystal panel 23 according to an opening section (white portion in FIG. 35) of the parallax barrier 24. In the stereoscopic display device shown in FIG. 35, a main factor that causes crosstalk is that after light from the backlight 22 emitted for displaying the image for right eye 25 is reflected by a light shielding part (black portion in FIG. 35) of the parallax barrier 24, the light is again reflected by the liquid crystal panel 23 and passes through the opening section of the parallax barrier 24 to go out to a direction of the left eye 26. The first preferred embodiment can be applied to even such a crosstalk. In the stereoscopic display device shown in FIG. 35, when a still image is displayed, the image for right eye 25 or the image for left eye 26 is always displayed on predetermined pixels of the liquid crystal panel 23. For this reason, the overdriving part 4 shown in FIG. 1 performs the overdriving process not for one frame as described above but for each pixel.

Figure 36:
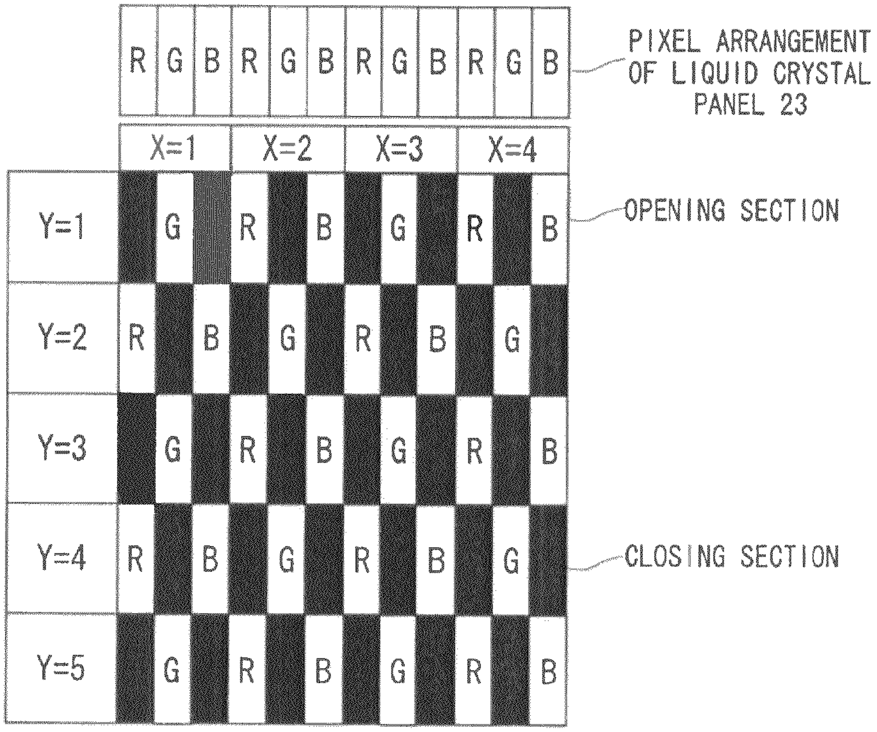
FIG. 36 is a diagram illustrating one example of an arrangement of a parallax barrier when viewed from a display surface in FIG. 35 according to the first preferred embodiment of the present invention.

FIG. 36 is a diagram illustrating one example of an arrangement of the parallax barrier 24 when viewed from the front surface in FIG. 35. The arrangement of the parallax barrier 24 when viewed from the front surface is various, but for example as shown in FIG. 36, the parallax barrier 24 is opened in units of RGB (Red, Green, Blue) sub-pixel into a checked pattern. FIG. 36 illustrates the opening section of the parallax barrier 24 (white portion in FIG. 36) and a closing section (black portion in FIG. 36) when viewed from the left eye 26. In this case, an attention is paid to a B pixel of X=2 and Y=2, which will be described below.

Originally, the B pixel of X=2 and Y=2 should not be visually recognized by the left eye 26, but the light is emitted as stray light from the four opening sections as a G pixel of X=2 and Y=2, an R pixel of X=3 and Y=2, a B pixel of X=2 and Y=1, and a B pixel of X=2 and Y=3, that are adjacent to the B pixel of X=2 and Y=2, and crosstalk occurs. Since an amount of the occurred crosstalk is proportional to display luminance of the B pixel of X=2 and Y=2, for example, compensation can be made on the B pixel of X=2 and Y=3. That is, the display luminance of the B pixel of X=2 and Y=3 is set darkly according to the light leaking from the B pixel of X=2 and Y=2, and thus the crosstalk can be corrected. As to the image to be inputted into the overdriving part 4 shown in FIG. 1, the right and left image are the same as each other in the above description (the system using the directional backlight 11 in FIG. 2), but in the stereoscopic display device in FIG. 35 (the system using the parallax barrier 24), the adjacent right and left pixels having the same color are replaced, thereby enabling the similar process.

Even when the correction is made by the overdriving part 4, the correction cannot be made at negative gradation and gradation exceeding 100%, and eventually the correction can be made only to the level shown in FIG. 18. Therefore, in the stereoscopic display device shown in FIG. 35, the overdriving part 4 shown in FIG. 1 is replaced by the crosstalk correcting part, and the correction data part 6 calculates the black-side correction data and the white-side correction data (the data of amount that cannot be sufficiently corrected by the crosstalk correcting part) based on gradation of a target pixel and gradation of an adjacent pixel having the same color. As a result, the process similar to that in the above description (FIG. 1) can be performed.

Figure 37:
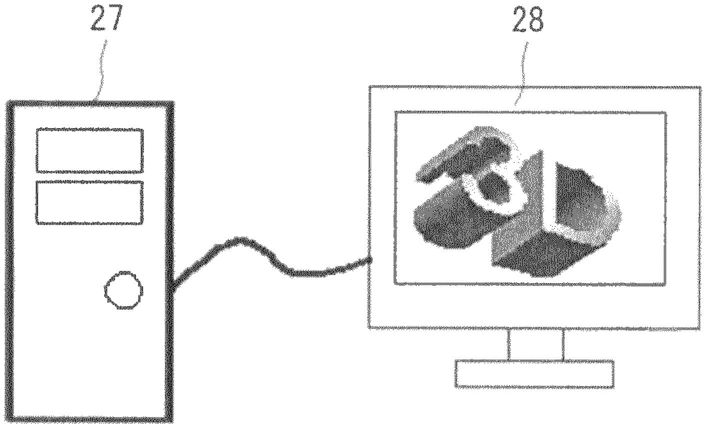
FIG. 37 is a diagram illustrating one example of the constitution of the stereoscopic display device according to the first preferred embodiment of the present invention.

Actual usage examples of the correcting method according to the first preferred embodiment include various applications. One of the applications is the method where all the processes shown in FIG. 1 are provided to a 3D display device 28 (stereoscopic display device) shown in FIG. 37. Another application is a method where only the correction image generator 3 shown in FIG. 1 is provided to a PC (Personal Computer) 27 (stereoscopic image generating device) shown in FIG. 37. Still another application is a method where all the processes shown in FIG. 1 are provided to the PC 27 shown in FIG. 37. When the correction image generator 3 is provided to the PC 27, since a still image can be processed by software, a still image is captured into a display output part of software such as stereoscopic viewer, thereby improving the visibility of the stereoscopic viewing. Since the ability of the device is used as the corrected data in the correcting system according to the first preferred embodiment, any calibration is necessary. When the correcting system according to the first preferred embodiment is incorporated into software, a crosstalk image and a reference image without crosstalk are arranged and displayed as described above, and both of the images are compared, and thus a user can create the data. In a PC where ability is partly mounted into hardware or high-performance CPU (Central Processing Unit) is provided, a moving image can be corrected in real time.

When the correction according to the first preferred embodiment is made, an edge of a ghost, which is visually recognized due to crosstalk when the correction is not made, is obscured and thus hardly recognized by human's eyes. As a result, the visibility of the stereoscopic display device can be greatly improved. Since the original contrast of the stereoscopic display device is maintained on a portion of a region without crosstalk that is far from a region with crosstalk (for example, both ends and the center of the respective frame images shown in FIG. 33), the deterioration in the entire display quality can be suppressed at minimum in comparison with the method for lowering the contrast of the entire screen and correcting crosstalk. In this manner, by taking into consideration the amount of complicated crosstalk that is caused by a response delay of the liquid crystal and the like, and by maintaining the display quality to a maximum extent, the amount of the crosstalk can be reduced.

Second Preferred Embodiment

In the first preferred embodiment, the process in the 2DLPFs needs the heaviest load. In a second preferred embodiment, the load of the process in the 2DLPFs is reduced. The method will be described below.

Figure 38:
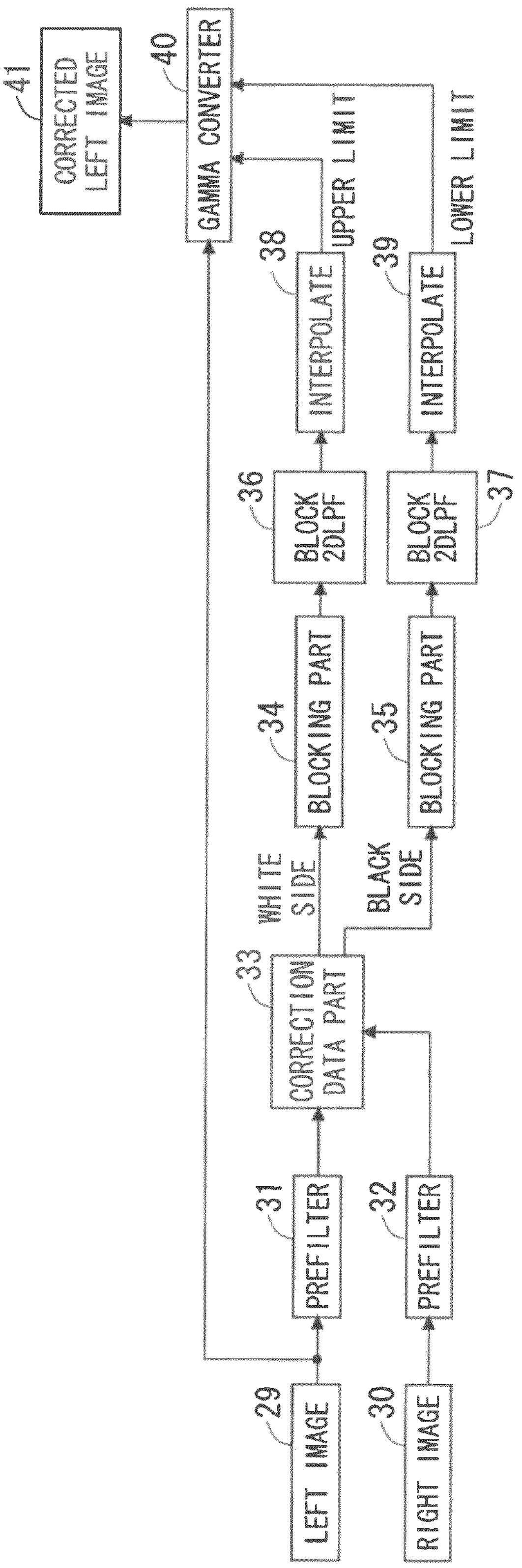
FIG. 38 is a block diagram illustrating one example of a corrected image generator according to a second preferred embodiment of the present invention.

FIG. 38 is a block diagram illustrating one example of a correction image generator according to the second preferred embodiment of the present invention. Since the other constitutions and operations are similar to those in the first preferred embodiment shown in FIG. 1, the description thereof will not be given. FIG. 38 illustrates the block diagram where a left image 29 is corrected, but the similar process is also performed on a right image 30.

As shown in FIG. 38, the left image 29 and the right image 30 pass through prefilters 31 and 32. The prefilters 31 and 32 are described in detail later. The left image 29 and the right image 30 that passed through the prefilters 31 and 32 are inputted into a correction data part 33, and are divided into white-side correction data and black-side correction data on the left image 29 to be outputted. The white-side correction data is inputted into the blocking part 34, and the black-side correction data is inputted into a blocking part 35. The blocking parts 34 and 35 block, for example, pixels of 8×8 as one block. For example, in a case of total pixels of 640×480, blocks become 80×60. As to the blocking method, a method for obtaining a maximum value from 64 corrected data included in one block produces the highest correcting effect. When the maximum value is obtained, even if only noise of one pixel is present on an original image, a maximum value is obtained unconditionally, and thus a correcting amount becomes large even on a region that does not originally require the correction (a region where crosstalk is entirely less).

In order to eliminate the above noise, the prefilters 31 and 32 are provided in the second preferred embodiment. The prefilters may be simple mean filters. However, a filter region is preferably narrow, but when the filter region is too wide, a position of the edge is obscured. A filter that makes an edge clear and produces the noise eliminating effect is a median filter. The median filter adopts a method for arranging data in a filter region in ascending or descending order and obtaining the data in the center order as output data. Since the median filter requires rearrangement of the data, when the prefilter region is large, an operating amount becomes bloated. Normally, the region sufficiently includes about nine peripheral pixels including the observation point, but an experiment is conducted also as to filter types, and an optimum range may be determined.

Figure 39:
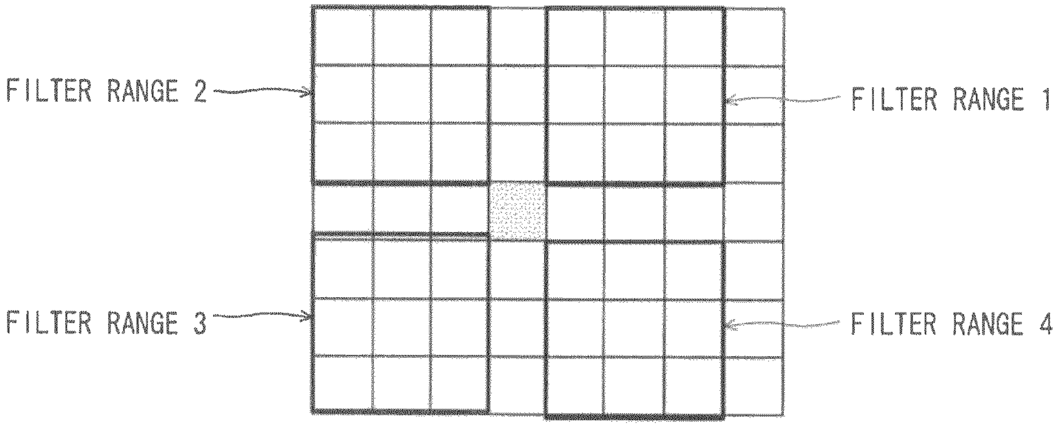
FIGS. 39 and 40 are diagrams each illustrating one example of setting of a filter range in a two-dimensional filter according to the second preferred embodiment of the present invention.
Figure 40:
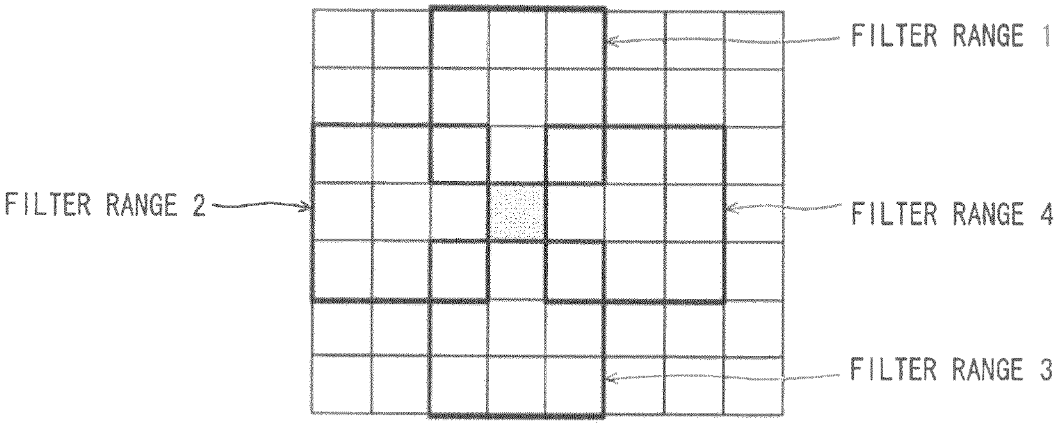

The white-side correction data and the black-side correction data blocked by the blocking parts 34 and 35 are inputted into block 2DLPFs 36 and 37, and undergo the LPF process similar to the method described with reference to the equation (24) and FIGS. 29 to 32. However, a difference in the process of the block 2DLPFs 36 and 37 is that when the LPF process is performed on each pixel on the region of 16×16 pixels, one block includes 8×8 pixels, and thus the LPF process may be performed on 2×2 blocks. That is, the block 2DLPFs 36 and 37 perform the process in block unit. Further, the range of the LPF process preferably does not include a self block as shown in FIGS. 39 and 40, for example. This is because when the range includes a self block, a correcting amount becomes smaller than an originally required amount in the interpolating operation of later interpolations 38 and 39.

Figure 41:
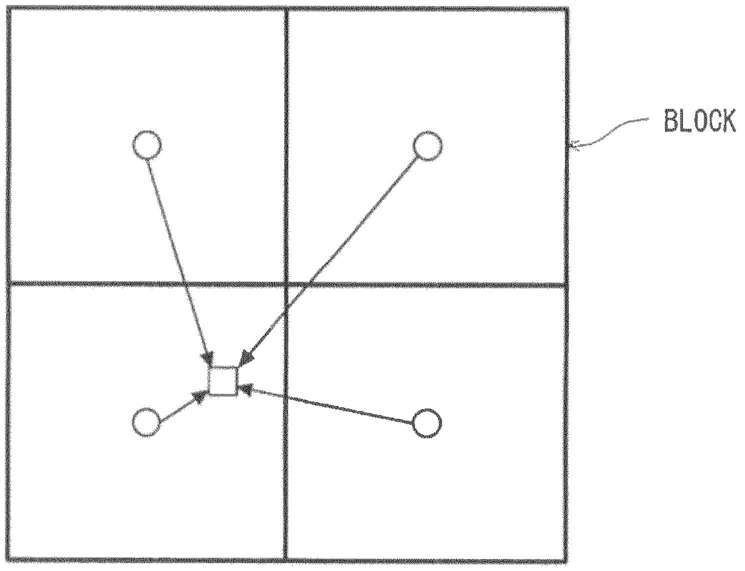
FIG. 41 is a schematic diagram illustrating an interpolating operation according to the second preferred embodiment of the present invention.

The pieces of data outputted from the block 2DLPFs 36 and 37 are interpolated by the interpolations 38 and 39 and become information for respective pixels. FIG. 41 is a schematic diagram illustrating the interpolation. A value stored in the block is close to a value near the center of the block, and a value of a dotted square is interpolated from data on the block itself and adjacent three blocks (circles). When the interpolation is performed by using the four points, a bilinear method is used. When the operating amount is desired to be reduced, the interpolation can be performed from three points excluding the point on the upper right block (circle) shown in FIG. 41 by the linear method.

The process after the interpolations 38 and 39 is similar to that in the first preferred embodiment, and a gamma converter 40 generates a corrected image (for example, a corrected left image 41 shown in FIG. 38). An image to be inputted into the gamma converter 40 (for example, the left image 29 shown in FIG. 38) does not desirably pass through the prefilter 31.

As a result, in the second preferred embodiment, an operating amount and a memory amount necessary for the operation particularly in the block 2DLPFs 36 and 37 can be reduced. In the first preferred embodiment, when the range in the 2DLPFs 7 and 8 shown in FIG. 1 where the LPF process is performed is wide, a correction slope becomes gentle and long, and thus, an effect for obscuring a ghost is heightened. However, a ghost on an area narrower than the range is calculated slightly inaccurately due to smoothing, and thus the sufficient correcting effect cannot be obtained. On the other hand, in the second preferred embodiment, a maximum value of the correcting amount in the blocks at the time of blocking is obtained, and thus an effect such that the above phenomenon hardly occurs can be obtained.

Third Preferred Embodiment

In the first and second preferred embodiments, both the upper limit value (white-side correction data) and the lower limit value (black-side correction data) are used as limit values to be inputted into the gamma converters 9 and 40.

As is defined in CIE 1976 L*(⅓-squares of the luminance), a luminosity factor of human eyes is sensitive to a slight difference at low luminance (luminance difference). For this reason, even when a little crosstalk occurs on the white side, visual recognition of the white side is not as difficult as the black side. Therefore, even when crosstalk is present on the white side, if the level of the crosstalk is allowable, the above-described process for operating the upper limit value can be omitted. As a result, the operating amount can be greatly reduced.

On the other hand, for example, TN (twist nematic) liquid crystal that is widely used has a responsive property such that response from white to black is much faster than response from black to white. When such a liquid crystal is used and other factors of the crosstalk is less, the above-described process for operating the lower limit value can be omitted. As a result, the operating amount can be greatly reduced.

When the correction is made on the white side and the black side entirely and uniformly as shown in FIGS. 11 and 12, the contrast is greatly reduced and thus the image quality is deteriorated. However, the main factor thereof is the uniform correction on the black side, and the uniform correction on the white side does not become a factor of the image quality deterioration so much. This is clear from the following. For example, when the original contrast is 100=1 (as to the luminance, white: 100, black: 1) and the same crosstalk of 1% occurs on the white side and the black side, the uniform correction only on the black side changes the contrast into 50:1 (as to the luminance, white: 100, black 1+1=2), and the uniform correction only on the white side changes the contrast into 99:1 (as to the luminance, white: 100−1=99, black: 1). Therefore, in the case of FIG. 1, the operation of 2DLPF 7 on the white side can be omitted, and a fixed value (for example, a level of the maximum crosstalk occurring on the white side, and in the above example, the luminance is 99) is inputted into the upper limit value to be inputted into the gamma converter 9. As a result, the white side is uniformly corrected, and in the black side, the correction is made only on a periphery of the black side on a place where crosstalk occurs. As a result, the operating amount can be greatly reduced, and the image quality can be approximately maintained.

Even when only one of the operations for the upper limit and the lower limit is used, the operating amount can be greatly reduced, and a satisfactory corrected result can be maintained. When an integrated circuit is designed so as to operate any one of the upper limit and the lower limit, the upper limit operation and the lower limit operation may be set to be switchable in order to cope with any one of the characteristics of the upper limit and the lower limit. When only one of the upper limit and the lower limit is operated, in the first and second preferred embodiments, for example, it goes without saying that the operation to be omitted (upper limit or lower limit) (for example, when the upper limit is omitted, in FIG. 34, the operation of the white-side correction data in the correction data part 6, the 2DLPF 7, the value relating to the white side in the corrected data table 20, and in FIG. 38, the operation of the white-side correction data in the correction data part 33, the blocking part 34, the block 2DLPF 36, the interpolation 38) can be omitted.

While the invention has been shown and described in detail, the foregoing description is in all aspects illustrative and not restrictive. It is therefore understood that numerous modifications and variations can be devised without departing from the scope of the invention.

What is claimed is:

1. A method for correcting stereoscopic images in which a stereoscopic image displayed based on a left image and a right image is corrected, the method comprising:

(a) inputting said left image and said right image and detecting a range of crosstalk and a crosstalk amount occurring on said left image or on said right image of black-side correction data for crosstalk causing bright display based on crosstalk characteristic data obtained based on gradation of said left image and gradation of said right image, and detecting the range of crosstalk and the crosstalk amount of white-side correction data for crosstalk causing dark display based on crosstalk characteristic data obtained based on gradation of said left image and gradation of said right image;

(b) inputting said black-side correction data into a black-side smoothing filter after said step (a), the black-side smoothing filter allowing said black-side correction data to have a smooth slope from an inside of the range where said crosstalk occurs to an outside of the range where said crosstalk occurs and making said black-side correction data into lower-limit data, and inputting said white-side correction data into a white-side smoothing filter after said step (a), the white-side smoothing filter allowing said white-side correction data to have a smooth slope from an inside of the range where said crosstalk occurs to an outside of the range where said crosstalk occurs, and making said white-side correction data into upper-limit data; and (c) gamma-converting said left image or said right image based on at least one of said lower-limit data and said upper-limit data after said step (b), and generating a corrected left image or a corrected right image.

2. The method for correcting stereoscopic images according to claim 1, wherein in said step (b), each of said black-side smoothing filter and said white-side smoothing filter divides a periphery of a pixel to be processed into a plurality of areas, and a maximum value of absolute values of said black-side correction data or said white-side correction data smoothed in each of said areas is used as said lower-limit data or said upper-limit data.

3. The method for correcting stereoscopic images according to claim 1, further comprising:

(d) blocking any of plural pieces of said black-side correction data or plural pieces of said white-side correction data after said step (a), wherein in said step (b), said black-side and said white-side smoothing filters perform a process in block unit.

4. The method for correcting stereoscopic images according to claim 1, further comprising (e) eliminating noise components included in said left image and said right image using prefilters prior to said step (a).

5. The method for correcting stereoscopic images according to claim 1, wherein in said step (a), making a correction on at least one of said black-side correction data and said white-side correction data based on a temperature of a usage environment.

6. The method for correcting stereoscopic images according to claim 1, further comprising (f) performing an overdrive process on said corrected left image or said corrected right image after said step (c).

7. The method for correcting stereoscopic images according to claim 6, wherein in said step (f), said overdrive process includes correction based on a temperature of a usage environment.

8. A stereoscopic display device for correcting stereoscopic images in which a stereoscopic image displayed based on a left image and a right image is corrected, comprising:

an inputting part configured to input said left image and said right image;

a detecting part configured to detect a range of crosstalk and a crosstalk amount occurring on said left image or on said right image of black-side correction data for crosstalk causing bright display based on crosstalk characteristic data obtained based on gradation of said left image and gradation of said right image, and the range of crosstalk and the crosstalk amount of white-side correction data for crosstalk causing dark display based on crosstalk characteristic data obtained based on gradation of said left image and gradation of said right image;

a black-side smoothing filter configured to receive said black-side correction data and to smooth a black-side slope from an inside of the range where said crosstalk occurs to an outside of the range where said crosstalk occurs and to provide said smoothed black-side correction data as lower-limit data;

a white-side smoothing filter configured to receive said white-side correction data and to smooth a white-side slope from an inside of the range where said crosstalk occurs to an outside of the range where said crosstalk occurs and to provide said smoothed white-side correction data as upper-limit data; and a gamma-converting part configured to receive and gamma convert said left image or said right image based on at least one of said lower-limit data and said upper-limit data received from said black-side smoothing filter or said white-side smoothing filter and to generate a corrected left image or a corrected right image.

9. The stereoscopic display device according to claim 8, further comprising an overdriving part for performing an overdrive process on the corrected left image or the corrected right image generated by said gamma-converting part.

10. A stereoscopic image generating device, wherein said image is corrected according to characteristics of said stereoscopic display device according to claim 8.

* * * * *